(12) United States Patent
Kuppa et al.

(10) Patent No.: US 11,758,433 B1
(45) Date of Patent: Sep. 12, 2023

(54) MANAGING HOPPING TARGET WAKE TIMES FOR WIRELESS NETWORKS

(71) Applicant: QUALCOMM Incorporated, San Diego, CA (US)

(72) Inventors: Srikant Kuppa, Fremont, CA (US); Sandip Homchaudhuri, San Jose, CA (US); Yongchun Xiao, San Jose, CA (US); Hao-Jen Cheng, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/740,232

(22) Filed: May 9, 2022

(51) Int. Cl.
*H04W 28/02* (2009.01)
*H04B 1/713* (2011.01)

(52) U.S. Cl.
CPC ........ *H04W 28/0289* (2013.01); *H04B 1/713* (2013.01)

(58) Field of Classification Search
CPC ..... H04L 5/006; H04L 5/0055; H04L 5/0005; H04L 5/0007; H04L 5/0012; H04L 5/0037; H04L 5/0094; H04W 72/04; H04W 84/12; H04W 72/23; H04W 72/0453; H04W 74/0816; H04W 88/08; H04W 16/10; H04B 7/26; H04B 7/2621; H04B 7/0413; H04B 7/0417; H04B 17/318; H04B 7/04; H04B 7/043

USPC ........................................................ 375/132
See application file for complete search history.

(56) References Cited

U.S. PATENT DOCUMENTS

| | | | |
|---|---|---|---|
| 8,335,179 B2 * | 12/2012 | Hayashino | H04W 72/02 370/461 |
| 2015/0222410 A1 * | 8/2015 | Belghoul | H04L 27/0006 370/252 |
| 2017/0280388 A1 * | 9/2017 | Asterjadhi | H04W 72/21 |
| 2019/0045438 A1 * | 2/2019 | Cariou | H04W 52/0219 |
| 2022/0132481 A1 * | 4/2022 | Jiang | H04L 5/0005 |
| 2022/0174594 A1 * | 6/2022 | Siraj | H04W 52/0216 |

\* cited by examiner

*Primary Examiner* — Eva Y Puente
(74) *Attorney, Agent, or Firm* — Holland & Hart / Qualcomm

(57) ABSTRACT

Methods, systems, and devices for wireless communications are described. A station (STA) may receive a first signal including an indication of a set of frequency channels for a set of target wake time (TWT) sessions that recur according to a service interval. In some examples, the first signal may indicate a respective frequency channel of the set of frequency channels for each TWT session of the set of target wake time sessions. Each TWT session of the set of TWT sessions may have an associated service period that the STA may be in an awake state. The STA may switch, for the first TWT session, from the first frequency channel to the second frequency channel. In some examples, based on the switching, the STA may communicate a signal during a service period associated with the first TWT session over the second frequency channel.

62 Claims, 22 Drawing Sheets

MANAGING HOPPING TARGET WAKE TIMES FOR WIRELESS NETWORKS

TECHNICAL FIELD

The following relates to wireless communications, including managing hopping of frequency channels over target wake time (TWT) sessions.

DESCRIPTION OF THE RELATED TECHNOLOGY

Wireless communications systems are widely deployed to provide various types of communication content such as voice, video, packet data, messaging, broadcast, and so on. These systems may be multiple-access systems capable of supporting communication with multiple users by sharing the available system resources (for example, time, frequency, and power). A wireless network, for example a WLAN, such as a Wi-Fi (for example, Institute of Electrical and Electronics Engineers (IEEE) 802.11) network may include an access point (AP) that may communicate with one or more stations (STAs) or mobile devices. The AP may be coupled to a network, such as the Internet, and may enable a mobile device to communicate via the network (or communicate with other devices coupled to the AP). A wireless device may communicate with a network device bi-directionally. For example, in a WLAN, a STA may communicate with an associated AP via downlink (DL) and uplink (UL) directions. The DL (or forward link) may refer to the communication link from the AP to the station, and the UL (or reverse link) may refer to the communication link from the station to the AP.

In some cases, an AP (for example, a software-enabled AP (SoftAP), an infrastructure AP) operating in a self-managed network may configure multiple STAs with TWT sessions during which the associated STA or STAs are expected to be in an awake state. A self-managed network may be an example of a wireless network in which multiple communication devices (for example, multiple STAs, multiple SoftAPs) may form (for example, self-organize) a PAN (for example, without a centralized entity). As described herein, a self-managed network may be referred to as an extended personal area network (xPAN). In some cases, by configuring multiple STAs associated with the AP with TWT sessions, the AP may manage activity of STAs associated with the AP within the self-managed network. In some cases, an increased number of STAs may be collocated (for example, spatially located with a relatively close proximity) and operate within the self-managed network, which leads to increased congestion of communication channels. To reduce congestion, some APs may employ channel switching announcements (CSAs) to indicate to one or multiple STAs in the self-managed network to switch operating frequencies, such as to switch frequency channels. In some cases, by transmitting CSAs to indicate to the one or more STAs to switch frequency channels, current (for example, active, previously negotiated) TWT sessions may be canceled and the AP may restart (for example, reinitiate, renegotiate) additional (for example, subsequent) TWT sessions for the one or more STAs, which may lead to increased latency within the self-managed network, among other issues. In some cases, such techniques (for example, techniques that rely on CSAs to switch operating frequencies) may, however, be rigid and unsuitable for STAs with strict latency requirements.

SUMMARY

The systems, methods and devices of this disclosure each have several innovative aspects, no single one of which is solely responsible for the desirable attributes disclosed herein. One innovative aspect of the subject matter described in this disclosure can be implemented in a method for wireless communication. The method includes receiving a first signal including an indication of a set of frequency channels for a set of target wake time (TWT) sessions that recur according to a service interval, the first signal indicating a respective frequency channel of the set of frequency channels for each TWT session of the set of TWT sessions, each TWT session of the set of TWT sessions having an associated service period during which a station (STA) is expected to be in an awake state, switching, for a first TWT session of the set of TWT sessions, from a first frequency channel indicated by the first signal to a second frequency channel in accordance with a frequency hopping pattern associated with the first TWT session, and communicating a second signal during a service period associated with the first TWT session over the second frequency channel based on the switching.

Another innovative aspect of the subject matter described in this disclosure can be implemented in an apparatus for wireless communication. The apparatus includes a processor, memory coupled with the processor and storing instructions executable by the processor to cause the apparatus to receive a first signal including an indication of a set of frequency channels for a set of TWT sessions that recur according to a service interval, the first signal indicating a respective frequency channel of the set of frequency channels for each TWT session of the set of TWT sessions, each TWT session of the set of TWT sessions having an associated service period during which the STA is expected to be in an awake state, switching, for a first TWT session of the set of TWT sessions, from a first frequency channel indicated by the first signal to a second frequency channel in accordance with a frequency hopping pattern associated with the first TWT session, and communicate a second signal during a service period associated with the first TWT session over the second frequency channel based on the switching.

Another innovative aspect of the subject matter described in this disclosure can be implemented in an apparatus for wireless communication. The apparatus includes means for receiving a first signal including an indication of a set of frequency channels for a set of TWT sessions that recur according to a service interval, the first signal indicating a respective frequency channel of the set of frequency channels for each TWT session of the set of TWT sessions, each TWT session of the set of TWT sessions having an associated service period during which the STA is expected to be in an awake state, means for switching, for a first TWT session of the set of TWT sessions, from a first frequency channel indicated by the first signal to a second frequency channel in accordance with a frequency hopping pattern associated with the first TWT session, and means for communicating a second signal during a service period associated with the first TWT session over the second frequency channel based on the switching.

Another innovative aspect of the subject matter described in this disclosure can be implemented in a non-transitory computer-readable medium storing code for wireless communication. The code includes instructions executable by a processor to receive a first signal including an indication of a set of frequency channels for a set of TWT sessions that recur according to a service interval, the first signal indicating a respective frequency channel of the set of frequency channels for each TWT session of the set of TWT sessions, each TWT session of the set of TWT sessions having an associated service period during which the STA is expected to be in an awake state, switching, for a first TWT session of the set of TWT sessions, from a first frequency channel indicated by the first signal to a second frequency channel in accordance with a frequency hopping pattern associated with the first TWT session, and communicate a second signal during a service period associated with the first TWT session over the second frequency channel based on the switching.

In some examples of the method, apparatuses, and non-transitory computer-readable medium described herein, communicating the second signal may include operations, features, means, or instructions for receiving, from an access point (AP), the second signal during the service period associated with the first TWT session over the second frequency channel based on the switching.

In some examples of the method, apparatuses, and non-transitory computer-readable medium described herein, communicating the second signal may include operations, features, means, or instructions for transmitting, to another STA, the second signal during the service period associated with the first TWT session over the second frequency channel based on the switching.

Another innovative aspect of the subject matter described in this disclosure can be implemented in a method for wireless communication. The method includes transmitting a first signal including an indication of a set of frequency channels for a set of TWT sessions that recur according to a service interval, the first signal indicating a respective frequency channel of the set of frequency channels for each TWT session of the set of TWT sessions, each TWT session of the set of TWT sessions having an associated service period during which an STA is expected to be in an awake state, transmitting a second signal indicating to the STA to switch, for a first TWT session of the set of TWT sessions, from a first frequency channel indicated by the first signal to a second frequency channel in accordance with a frequency hopping pattern associated with the first TWT session, and communicating a third signal during a service period associated with the first TWT session over the second frequency channel based on the switching.

Another innovative aspect of the subject matter described in this disclosure can be implemented in an apparatus for wireless communication. The apparatus may include a processor, memory coupled with the processor and storing instructions executable by the processor to cause the apparatus to transmit a first signal including an indication of a set of frequency channels for a set of TWT sessions that recur according to a service interval, the first signal indicating a respective frequency channel of the set of frequency channels for each TWT session of the set of TWT sessions, each TWT session of the set of TWT sessions having an associated service period during which an STA is expected to be in an awake state, transmit a second signal indicating to the STA to switch, for a first TWT session of the set of TWT sessions, from a first frequency channel indicated by the first signal to a second frequency channel in accordance with a frequency hopping pattern associated with the first TWT session, and communicate a third signal during a service period associated with the first TWT session over the second frequency channel based on the switching.

Another innovative aspect of the subject matter described in this disclosure can be implemented in an apparatus for wireless communication. The apparatus includes means for transmitting a first signal including an indication of a set of frequency channels for a set of TWT sessions that recur according to a service interval, the first signal indicating a respective frequency channel of the set of frequency channels for each TWT session of the set of TWT sessions, each TWT session of the set of TWT sessions having an associated service period during which an STA is expected to be in an awake state, means for transmitting a second signal indicating to the STA to switch, for a first TWT session of the set of TWT sessions, from a first frequency channel indicated by the first signal to a second frequency channel in accordance with a frequency hopping pattern associated with the first TWT session, and means for communicating a third signal during a service period associated with the first TWT session over the second frequency channel based on the switching.

Another innovative aspect of the subject matter described in this disclosure can be implemented in a non-transitory computer-readable medium storing code for wireless communication. The code includes instructions executable by a processor to transmit a first signal including an indication of a set of frequency channels for a set of TWT sessions that recur according to a service interval, the first signal indicating a respective frequency channel of the set of frequency channels for each TWT session of the set of TWT sessions, each TWT session of the set of TWT sessions having an associated service period during which an STA is expected to be in an awake state, transmit a second signal indicating to the STA to switch, for a first TWT session of the set of TWT sessions, from a first frequency channel indicated by the first signal to a second frequency channel in accordance with a frequency hopping pattern associated with the first TWT session, and communicate a third signal during a service period associated with the first TWT session over the second frequency channel based on the switching.

Some examples of the method, apparatuses, and non-transitory computer-readable medium described herein may further include operations, features, means, or instructions for determining the frequency hopping pattern based on monitoring channel congestion associated with the set of frequency channels, where transmitting the second signal indicating to the STA to switch from the first frequency channel to the second frequency channel may be based on determining the frequency hopping pattern.

DETAILED DESCRIPTION

Figure 1:
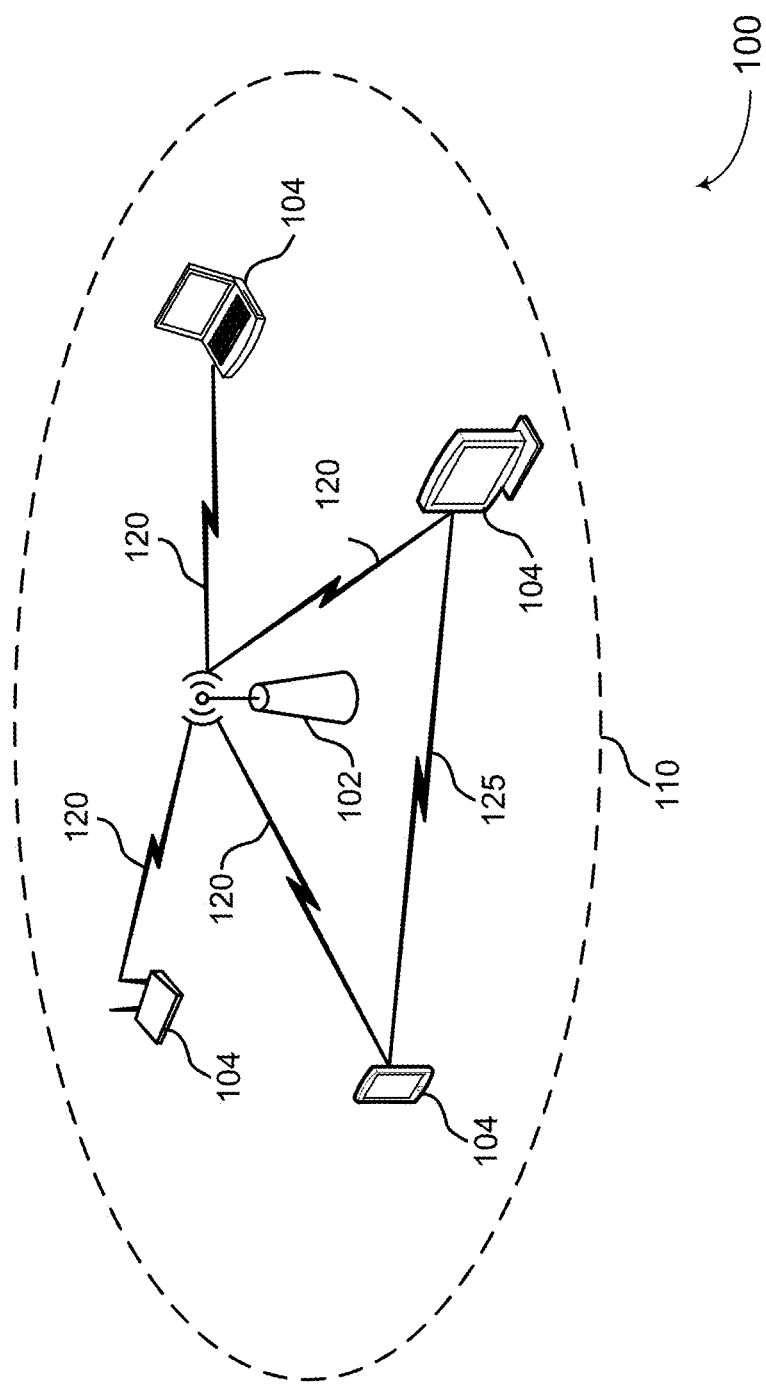
FIGS. 1-4 each illustrate an example of a wireless local area network (WLAN) that supports managing hopping target wake times (TWTs) for wireless networks in accordance with aspects of the present disclosure.

An access point (AP) operating in a self-managed network (for example, an extended personal area network, a network without a centralized entity, an extended reality (XR) network) may configure a station (STA) (for example, a client device) with a TWT session having an associated time interval (for example, a service period) during which the STA is generally expected to be in an awake state. For example, the AP may configure the STA served by the AP with one or multiple TWT sessions that may each be associated with a respective service period and frequency. During a configured TWT session, the STA may transmit communications to, or receive communications from, or both, the AP (for example), or other STAs, which may also be served by the AP. As such, the AP may manage some activity within the self-managed network and reduce the likelihood of collisions between multiple STAs (for example, the STAs served by the AP). In some cases, an increased number of STAs may be collocated (for example, may be spatially located within a relatively close proximity) and, as such, may operate within the self-managed network, which may lead to increased congestion of frequency channels used for communications, among other issues. To reduce congestion, the AP may employ a channel switching announcement (CSA) scheme to indicate to the one or multiple STAs to switch operating frequencies. For example, the AP may transmit a CSA to the one or multiple STAs, and the CSA may indicate to the one or multiple STAs to switch frequency channels (for example, corresponding to different frequencies). In some cases, however, by transmitting the CSA to indicate to the one or multiple STAs to switch frequency channels, current (for example, active, previously negotiated) TWT sessions may be cancelled and the AP may restart (for example, reinitiate, renegotiate) additional (for example, subsequent) TWT sessions for the one or multiple STAs, increasing latency within the network, among other issues. Such techniques (for example, techniques that rely on CSAs to change operating frequencies within self-managed networks) may, however, be rigid and unsuitable for STAs with strict latency requirements.

Various aspects generally relate to techniques for managing hopping frequency channels over TWT sessions, and more specifically, for configuring a STA to switch between the frequency channels for the TWT sessions. For example, an AP may configure the STA with a set of frequency channels for a set of TWT sessions (for example, TWT sessions negotiated between the AP and the STA) that recur according to a service interval. Each TWT session of the set of TWT sessions may be associated with a respective frequency channel of the set of frequency channels. The AP may monitor congestion (for example, a latency metric, a threshold metric) for each frequency channel of the set of frequency channels. Additionally or alternatively, the STA may monitor congestion (e.g., a congestion metric) at the STA and report (e.g., indicate, convey) information associated with the monitored congestion to the AP. In some examples, based on the congestion for each frequency channel (for example, channel conditions, such as channel conditions monitored at the AP, or the STA, or both), the AP may determine a hopping pattern for the set of TWT sessions. In some examples, if channel conditions of a frequency channel associated with a given TWT session are degraded (for example, if congestion for the frequency channel is relatively high) the AP may indicate to the STA to switch the frequency channel associated with the TWT session from a current frequency channel to a second frequency channel according to the hopping pattern (for example, for a subsequent service period of the TWT session in a subsequent service interval). In some examples, the AP may indicate to the STA to switch the frequency channel associated with the TWT session via a beacon signal transmitted before a next service period of the TWT session. Additionally or alternatively, the AP may indicate to the STA to switch the frequency channel associated with the next service period of the TWT session via a data signal, such as a quality of service (QoS) data signal, that may be transmitted between the AP and the STA during a current or previous service period of the TWT session. In some examples, the AP may indicate to the STA to switch the frequency channel associated with the TWT session by transmitting (for example, via the data signal or the beacon signal) an indication of the hopping pattern. The STA may then communicate (for example, transmit, or receive, or both) a signal during the next service period associated with the TWT session over the second frequency channel based on switching the frequency channel according to the hopping pattern.

Particular aspects of the subject matter described herein may be implemented to realize one or more of the following potential advantages. The techniques employed by the described AP and STA may enable frequency channel switching for multiple TWT sessions based on associated channel conditions within a wireless network. The AP may indicate to the STAs to switch frequency channels to reduce latency and congestion of the frequency channels used for communications during the TWT sessions. In some examples, by indicating to the STAs to switch frequency channels for multiple TWT sessions, the AP may avoid reinitiating TWT sessions for the STAs and, as such, may avoid unnecessary increases in signaling overhead for the STA. In some implementations, operations performed by the AP and the STA may support improvements to power consumption, reliability for communications, and throughput for the AP and the STA.

Aspects of the disclosure are initially described in the context of wireless local area networks (WLANs). Aspects of the disclosure are also described in the context of channel hopping schemes and process flows. Aspects of the disclosure are further illustrated by and described with reference to apparatus diagrams, system diagrams, and flowcharts that relate to managing hopping TWTs for wireless networks FIG. 1 illustrates a WLAN 100 (also known as a Wi-Fi network) configured in accordance with various aspects of the present disclosure. The WLAN 100 may include an AP 102 and multiple associated STAs 115, which may represent devices such as mobile stations, personal digital assistant (PDAs), other handheld devices, netbooks, notebook computers, tablet computers, laptops, display devices (for example, TVs, computer monitors), or printers. The AP 102 and the associated stations 115 may represent a BSS or an ESS. The various STAs 115 in the network are able to communicate with one another through the AP 102. Also shown is a coverage area 110 of the AP 102, which may represent a BSA of the WLAN 100. An extended network station (not shown) associated with the WLAN 100 may be connected to a wired or wireless distribution system that may allow multiple APs 105 to be connected in an ESS.

In the WLAN 100, a communication device (for example, an AP 102) may configure other communication devices (for example, one or multiple STAs 104) with TWT sessions, in which each STA 104 may be in an awake state. In some cases, an increased number of STAs 104 may be operating within the WLAN 100, which may lead to increased congestion of communication channels within the WLAN 100. To reduce congestion, the AP 102 may employ CSAs to indicate for one or multiple STAs to switch frequency channels, switching operating frequencies. In some cases, however, by transmitting CSAs to indicate for the one or more STAs 104 to switch frequency channels, the AP 102 may reinitiate TWT sessions for the one or more STAs 104 that may lead to increased latency within the WLAN 100. Some techniques that rely on a CSA to change operating frequencies may be rigid and not suitable for STAs 104 with stringent latency requirements.

In some examples, to reduce congestion within the WLAN 100, the AP 102 may transmit, to a STA 104 a first signal including an indication of a set of frequency channels for a set of TWT sessions that recur according to a service interval. In some examples, the first signal may indicate a respective frequency channel of the set of frequency channels for each TWT session of the set of target wake time sessions. Additionally or alternatively, each TWT session of the set of TWT sessions may have an associated service period that the STA 104 may be in an awake state. In some examples, the AP 102 may transmit another signal indicating to the STA 104 to switch, for a first TWT session of the set of TWT sessions, from a first frequency channel indicated by the first signal to a second frequency channel in accordance with a frequency hopping pattern that may be associated with the first TWT session. In response, the STA 104 may switch, for the first TWT session, from the first frequency channel to the second frequency channel. In some examples, based on the switching, the STA 104 may communicate a signal during a service period associated with the first TWT session over the second frequency channel. In some examples, by switching frequency channels for the first TWT session, the STA 104 may reduce the likelihood of collisions occurring within the WLAN 100.

Although not shown in FIG. 1, a STA 104 may be located in the intersection of more than one coverage area 110 and may associate with more than one AP 102. A single AP 102 and an associated set of STAs 115 may be referred to as a BSS. An ESS is a set of connected BSSs. A distribution system (not shown) may be used to connect APs 105 in an ESS. In some cases, the coverage area 110 of an AP 102 may be divided into sectors (also not shown). The WLAN 100 may include APs 105 of different types (for example, metropolitan area, home network), with varying and overlapping coverage areas 110. Two STAs 115 may also communicate directly via a direct wireless link 125 regardless of whether both STAs 115 are in the same coverage area 110. Examples of direct wireless links 120 may include Wi-Fi Direct connections, Wi-Fi Tunneled Direct Link Setup (TDLS) links, and other group connections. STAs 115 and APs 105 may communicate according to the WLAN radio and baseband protocol for physical and MAC layers from IEEE 802.11 and versions including, but not limited to, 802.11b, 802.11g, 802.11a, 802.11n, 802.11ac, 802.11ad, 802.11ah, 802.11ax. In other implementations, peer-to-peer connections or ad hoc networks may be implemented within WLAN 100.

In some cases, a STA 104 (or an AP 102) may be detectable by a central AP 102, but not by other STAs 115 in the coverage area 110 of the central AP 102. For example, one STA 104 may be at one end of the coverage area 110 of the central AP 102 while another STA 104 may be at the other end. Thus, both STAs 115 may communicate with the AP 102, but may not receive the transmissions of the other. This may result in colliding transmissions for the two STAs 115 in a contention based environment (for example, CSMA/CA) because the STAs 115 may not refrain from transmitting on top of each other. A STA 104 whose transmissions are not identifiable, but that is within the same coverage area 110 may be known as a hidden node. CSMA/CA may be supplemented by the exchange of an RTS packet transmitted by a sending STA 104 (or AP 102) and a CTS packet transmitted by the receiving STA 104 (or AP 102). This may alert other devices within range of the sender and receiver not to transmit for the duration of the primary transmission. Thus, RTS/CTS may help mitigate a hidden node problem.

Figure 2:
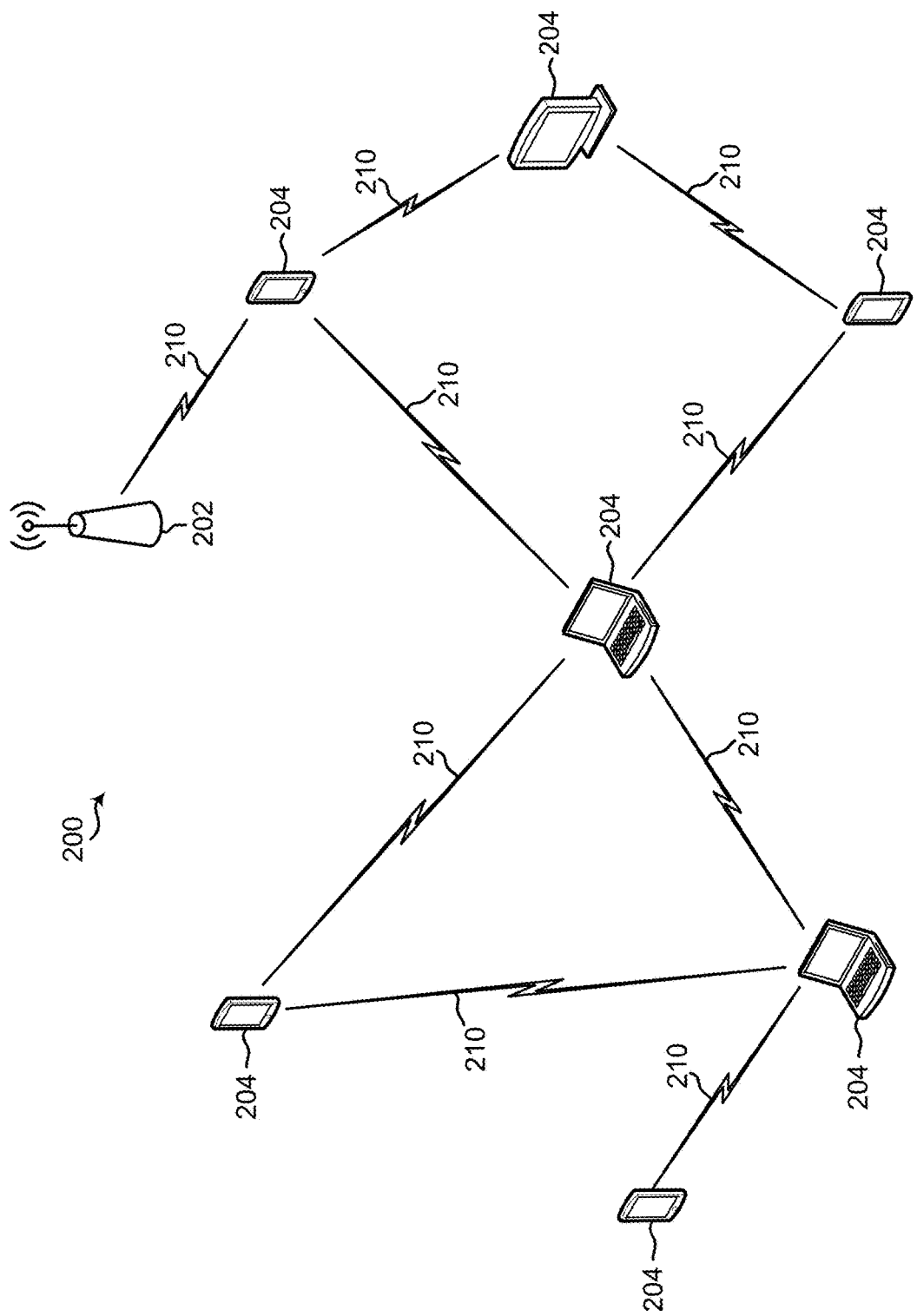

FIG. 2 illustrates an example of a WLAN 200 that supports managing hopping TWTs for wireless networks in accordance with one or more aspects of the present disclosure. According to some aspects, the WLAN 200 can be an example of a WLAN. For example, the WLAN 200 can be a network implementing at least one of the IEEE 802.11 family of standards. The WLAN 200 may include multiple STAs 204. As described above, each of the STAs 204 also may be referred to as a mobile station (MS), a mobile device, a mobile handset, a wireless handset, an access terminal (AT), a user equipment (UE), a subscriber station (SS), or a subscriber unit, among other possibilities. The STAs 204 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

The WLAN 200 is an example of a peer-to-peer (P2P), ad hoc or mesh network. STAs 204 can communicate directly with each other via P2P wireless links 210 (without the use of an intermediary AP). In some implementations, the WLAN 200 is an example of a neighbor awareness network (NAN). NANs operate in accordance with the Wi-Fi Alliance (WFA) Neighbor Awareness Networking (also referred to as NAN) standard specification. NAN-compliant STAs 204 (hereinafter also simply "NAN devices 204") transmit and receive NAN communications (for example, in the form of Wi-Fi packets including frames conforming to an IEEE 802.11 wireless communication protocol standard such as that defined by the IEEE 802.11-2016 specification or amendments thereof including, but not limited to, 802.11ay, 802.11ax, 802.11az, 802.11ba and 802.11be) to and from one another via wireless P2P links 210 (hereinafter also referred to as "NAN links") using a data packet routing protocol, such as Hybrid Wireless Mesh Protocol (HWMP), for path selection.

A NAN network generally refers to a collection of NAN devices that share a common set of NAN parameters including: the time period between consecutive discovery windows, the time duration of the discovery windows, the NAN beacon interval, and the NAN discovery channel(s). A NAN ID is an identifier signifying a specific set of NAN parameters for use within the NAN network. NAN networks are dynamically self-organized and self-configured. NAN devices 204 in the network automatically establish an ad-hoc network with other NAN devices 204 such that network connectivity can be maintained. Each NAN device 204 is configured to relay data for the NAN network such that various NAN devices 204 may cooperate in the distribution of data within the network. As a result, a message can be transmitted from a source NAN device to a destination NAN device by being propagated along a path, hopping from one NAN device to the next until the destination is reached.

Each NAN device 204 is configured to transmit two types of beacons: NAN discovery beacons and NAN synchronization beacons. When a NAN device 204 is turned on, or otherwise when NAN-functionality is enabled, the NAN device periodically transmits NAN discovery beacons (for example, every 100 TUs, every 128 TUs or another suitable period) and NAN synchronization beacons (for example, every 512 TUs or another suitable period). Discovery beacons are management frames, transmitted between discovery windows, used to facilitate the discovery of NAN clusters. A NAN cluster is a collection of NAN devices within a NAN network that are synchronized to the same clock and discovery window schedule using a time synchronization function (TSF). To join NAN clusters, NAN devices 204 passively scan for discovery beacons from other NAN devices. When two NAN devices 204 come within a transmission range of one another, they will discover each other based on such discovery beacons. Respective master preference values determine which of the NAN devices 204 will become the master device. If a NAN cluster is not discovered, a NAN device 204 may start a new NAN cluster. When a NAN device 204 starts a NAN cluster, it assumes the master role and broadcasts a discovery beacon. Additionally, a NAN device may choose to participate in more than one NAN cluster within a NAN network.

The links between the NAN devices 204 in a NAN cluster are associated with discovery windows—the times and channel on which the NAN devices converge. At the beginning of each discovery window, one or more NAN devices 204 may transmit a NAN synchronization beacon, which is a management frame used to synchronize the timing of the NAN devices within the NAN cluster to that of the master device. The NAN devices 204 may then transmit multicast or unicast NAN service discovery frames directly to other NAN devices within the service discovery threshold and in the same NAN cluster during the discovery window. The service discovery frames indicate services supported by the respective NAN devices 204.

In some instances, NAN devices 204 may exchange service discovery frames to ascertain whether both devices support ranging operations. NAN devices 204 may perform such ranging operations ("ranging") during the discovery windows. The ranging may involve an exchange of fine timing measurement (FTM) frames (such as those defined in IEEE 802.11-REVmc). For example, a first NAN device 204 may transmit unicast FTM requests to multiple peer NAN devices 204. The peer NAN devices 204 may then transmit responses to the first NAN device 204. The first NAN device 204 may then exchange a number of FTM frames with each of the peer NAN devices 204. The first NAN device 204 may then determine a range between itself and each of the peer devices 204 based on the FTM frames and transmit a range indication to each of the peer NAN devices 204. For example, the range indication may include a distance value or an indication as to whether a peer NAN device 204 is within a service discovery threshold (for example, 3 meters (m)) of the first NAN device 204. NAN links between NAN devices within the same NAN cluster may persist over multiple discovery windows as long as the NAN devices remain within the service discovery thresholds of one another and synchronized to the anchor master of the NAN cluster.

Some NAN devices 204 also may be configured for wireless communication with other networks such as with a Wi-Fi WLAN or a wireless (for example, cellular) wide area network (WWAN), which may, in turn, provide access to external networks including the Internet. For example, a NAN device 204 may be configured to associate and communicate, via a Wi-Fi or cellular link 212, with an AP or base station 202 of a WLAN or WWAN network, respectively. In such instances, the NAN device 204 may include SoftAP functionality enabling the STA to operate as a Wi-Fi hotspot to provide other NAN devices 204 with access to the external networks via the associated WLAN or WWAN backhaul. Such a NAN device 204 (referred to as a NAN concurrent device) is capable of operating in both a NAN network as well as another type of wireless network, such as a Wi-Fi BSS. In some such implementations, a NAN device 204 may, in a service discovery frame, advertise an ability to provide such AP services to other NAN devices 204.

There are two general NAN service discovery messages: publish messages and subscribe messages. Generally, publishing is a mechanism for an application on a NAN device to make selected information about the capabilities and services of the NAN device available to other NAN devices, while subscribing is a mechanism for an application on a NAN device to gather selected types of information about the capabilities and services of other NAN devices. A NAN device may generate and transmit a subscribe message when requesting other NAN devices operating within the same NAN cluster to provide a specific service. For example, in an active subscriber mode, a subscribe function executing within the NAN device may transmit a NAN service discovery frame to actively seek the availability of specific services. A publish function executing within a publishing NAN device capable of providing a requested service may, for example, transmit a publish message to reply to the subscribing NAN device responsive to the satisfaction of criteria specified in the subscribe message. The publish message may include a range parameter indicating the service discovery threshold, which represents the maximum distance at which a subscribing NAN device can avail itself of the services of the publishing NAN device. A NAN also may use a publish message in an unsolicited manner, for example, a publishing NAN device may generate and transmit a publish message to make its services discoverable for other NAN devices operating within the same NAN cluster. In a passive subscriber mode, the subscribe function does not initiate the transfer of any subscribe message, rather, the subscribe function looks for matches in received publish messages to determine the availability of desired services.

Subsequent to a discovery window is a transmission opportunity period. This period includes numerous resource blocks. A NAN device link (NDL) refers to the negotiated resource blocks between NAN devices used for NAN operations. An NDL can include more than one "hop." The number of hops depends on the number of devices between the device providing the service and the device consuming or subscribing to the service. An example of an NDL that includes two hops includes three NAN devices: the provider, the subscriber and a proxy to relay the information between the provider and the subscriber. In such a configuration, the first hop refers to the communication of information between the provider and the proxy, and the second hop refers to the communication of the information between the proxy and the subscriber. An NDL may refer to a subset of NAN devices capable of one-hop service discovery, but an NDL also may be capable of service discovery and subscription over multiple hops (a multi-hop NDL).

There are two general NDL types: paged NDL (P-NDL) and synchronized NDL (S-NDL). Each common resource block (CRB) of a P-NDL includes a paging window (PW) followed by a transmission window (TxW). All NAN devices participating in a P-NDL operate in a state to receive frames during the paging window. Generally, the participating NAN devices wake up during the paging window to listen on the paging channel to determine whether there is any traffic buffered for the respective devices. For example, a NAN device that has pending data for transmission to another NAN device may transmit a traffic announcement message to the other NAN device during the paging window to inform the other NAN device of the buffered data. If there is data available, the NAN device remains awake during the transmission window to exchange the data. If there is no data to send, the NAN device may transition back to a sleep state during the transmission window to conserve power. A NAN device transmits a paging message to its NDL peer during a paging window if it has buffered data available for the peer. The paging message includes, for example, the MAC addresses or identifiers of the destination devices for which data is available. A NAN device that is listed as a recipient in a received paging message transmits a trigger frame to the transmitting device and remains awake during the subsequent transmission window to receive the data. The NDL transmitter device transmits the buffered data during the transmission window to the recipient devices from whom it received a trigger frame. A NAN device that establishes an S-NDL with a peer NAN device may transmit data frames to the peer from the beginning of each S-NDL CRB without transmitting a paging message in advance.

Figure 3:
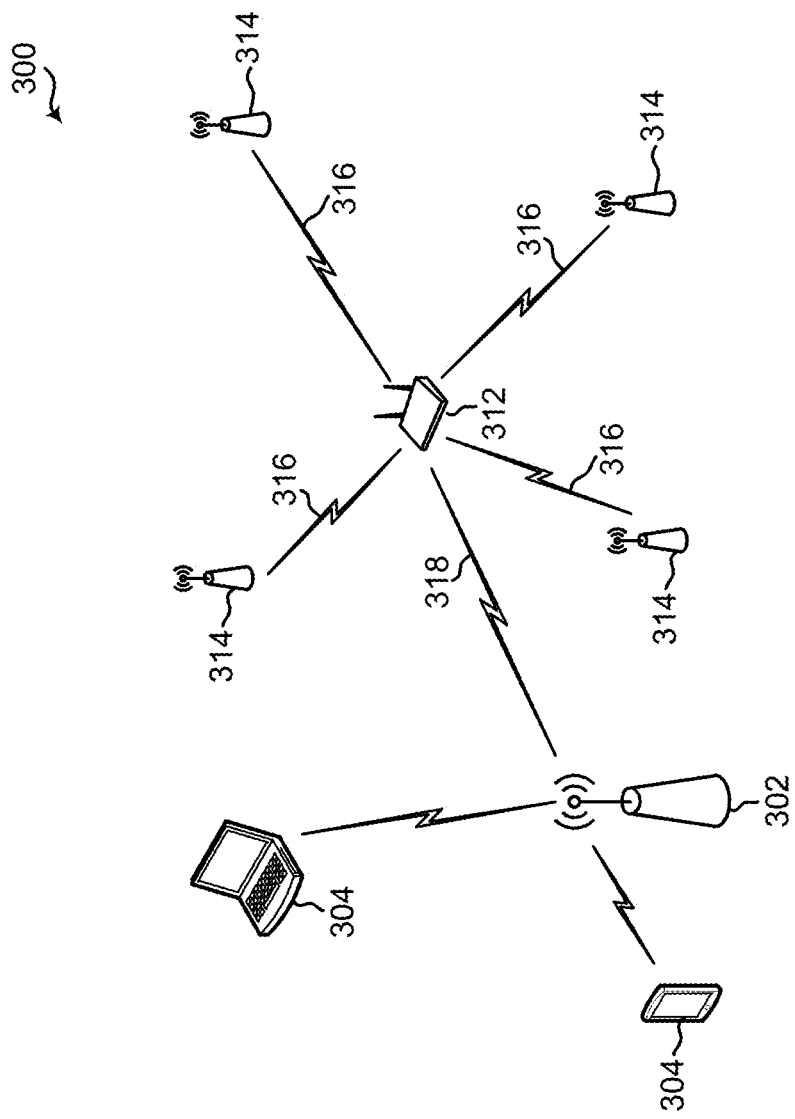

FIG. 3 illustrates an example of a WLAN 300 that supports managing hopping TWTs for wireless networks in accordance with one or more aspects of the present disclosure. According to some aspects, the WLAN 300 can be an example of a mesh network, an IoT network or a sensor network. The WLAN 300 may include multiple wireless communication devices 314. The wireless communication devices 314 may represent various devices such as display devices (for example, TVs, computer monitors, navigation systems, among others), music or other audio or stereo devices, remote control devices ("remotes"), printers, kitchen or other household appliances, among other possibilities.

In some implementations, the wireless communication devices 314 sense, measure, collect or otherwise obtain and process data and then transmit such raw or processed data to an intermediate device 312 for subsequent processing or distribution. Additionally or alternatively, the intermediate device 312 may transmit control information, digital content (for example, audio or video data), configuration information or other instructions to the wireless communication devices 314. The intermediate device 312 and the wireless communication devices 314 can communicate with one another via wireless links 316. In some implementations, the wireless links 316 include Bluetooth links or other PAN or short-range communication links.

In some examples, the intermediate device 312 also may be configured for wireless communication with other networks such as with a Wi-Fi WLAN or a wireless (for example, cellular) wide area network (WWAN), which may, in turn, provide access to external networks including the Internet. For example, the intermediate device 312 may be configured to associate and communicate, over a Wi-Fi link 318, with an AP 302 of a WLAN network, which also may serve various STAs 304. In some implementations, the intermediate device 312 is an example of a network gateway, for example, an IoT gateway. In such a manner, the intermediate device 312 may serve as an edge network bridge providing a Wi-Fi core backhaul for the IoT network including the wireless communication devices 314. In some implementations, the intermediate device 312 can be configured to analyze, preprocess and aggregate data received from the wireless communication devices 314 locally at the edge before transmitting it to other devices or external networks via the Wi-Fi link 318. The intermediate device 312 also can be configured to provide additional security for the IoT network and the data it transports.

Figure 4:
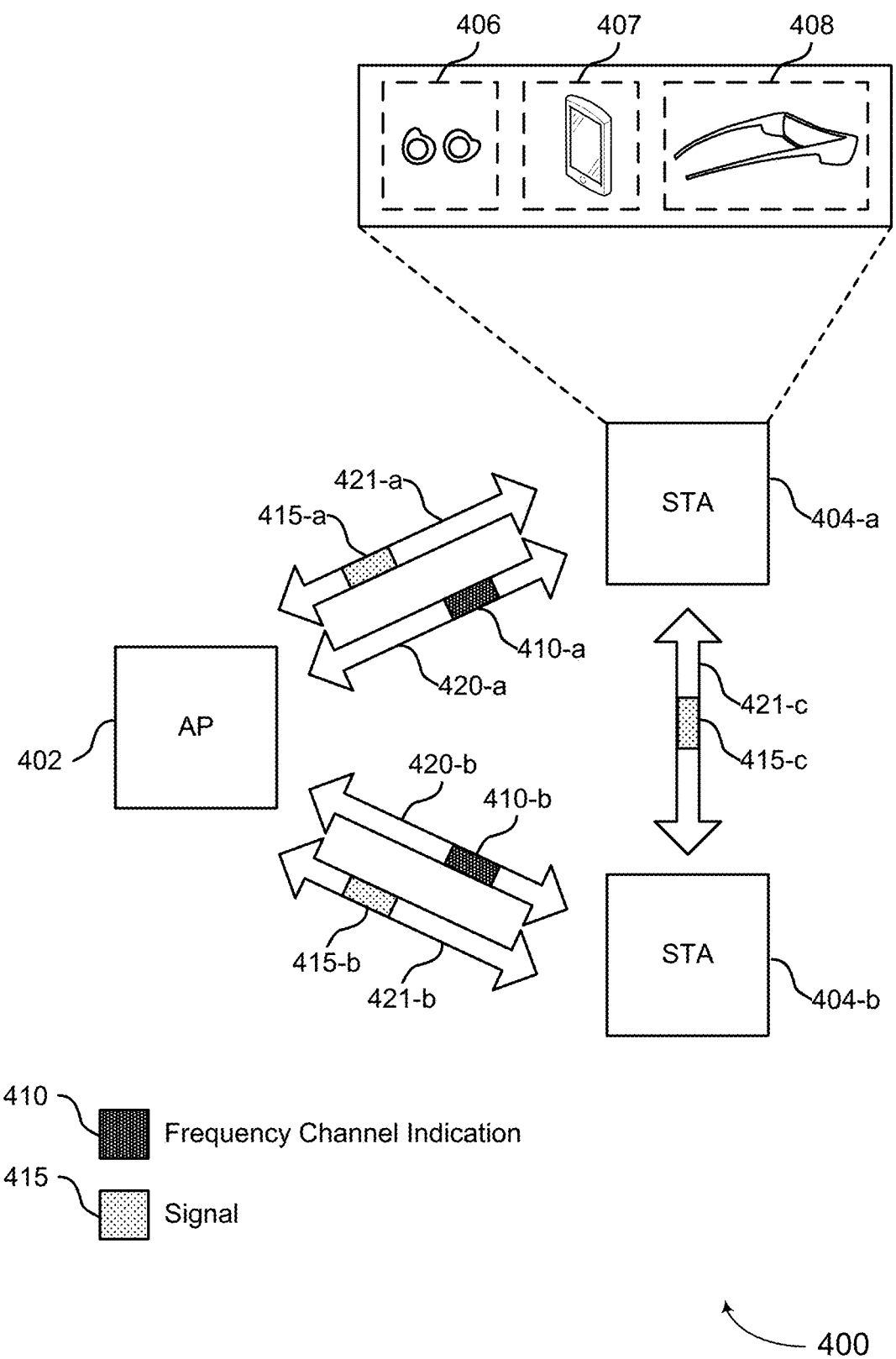

FIG. 4 illustrates an example of a WLAN 400 that supports managing hopping TWTs for wireless networks in accordance with one or more aspects of the present disclosure. The WLAN 400 may implement or be implemented by one or more aspects of the WLAN 100, the WLAN 200, and the WLAN 300. For example, the WLAN 400 may include an AP 402 and one or more STAs 404 (for example, a STA 404-a and a STA 404-b), which may be examples of the corresponding devices as described with reference to FIGS. 1-3. In the example of FIG. 4, the STA 404-a and the STA 404-b may each be an example of a wearable device (for example, a pair of earphones 406 or smart glasses 408) or a mobile device (for example, a user equipment (UE) 407). Additionally, or alternatively, in the example of FIG. 4, the AP 402 may be an example of a soft AP (for example, a UE operating in a mobile hotspot mode) or an infrastructure AP. In some examples, communications between the AP 402 and the STAs 404 may be examples of communications between peer communication devices communicating over TWT sessions. In some examples, communications between the AP 402 and the STAs 404 may be an example of communications between an infrastructure AP (for example, the AP 402, a device capable of forming a wireless local area network (WLAN), a router) and clients (for example, the STAs 404, UEs) that are associated with the infrastructure AP and configured to communicate over the TWT sessions. Additionally, or alternatively, communications between the AP 402 and the STAs 404 may be an example of communications between a soft AP (for example, the AP 402, a device capable of operating in a mobile hotspot mode, a UE) and clients (for example, the STAs 404, wearable devices) that are associated with the soft AP and part of the negotiated TWT sessions.

In some examples, the WLAN 400 may be an example of a self-managed network (for example, an xPAN). In such an example, the AP 402 may configure multiple STAs (for example, the STA 404-a and the STA 404-b) with TWT sessions, in which each of the STAs 404 may communicate with the AP 402 (or with other STAs, not shown). For example, the AP 402 may configure the STA 404-a and the STA 404-b with a TWT session that may include multiple (for example, non-overlapping) time intervals (for example, TWT sessions) or frequencies (or both) that the STA 404-a and the STA 404-b may transmit and receive communications. For example, each TWT session may have an associated service period that the STA 404-a or the STA 404-b (or both) may be in an awake state. As such, the AP 402 may manage activity within the WLAN 400 and reduce the likelihood of collisions between devices operating within the WLAN 400 (for example, between the STA 404-a or the STA 404-b and other STAs, not shown).

In some examples, the WLAN 400 may be an example an xPAN or an extended reality (XR) network, in which devices operating within the WLAN 400 (for example, the AP 402 and the STAs 404) may communicate via Wi-Fi. For example, in an xPAN, multiple devices (for example, the AP 402, the STAs 404, or other devices, not shown) may serve as sources of xPAN links that may be spawned (for example, generated, created) by a device (for example, a single user, the AP 402, the STA 404-a, the STA 404-b) operating within the WLAN 400 (for example, the xPAN). In some examples, the multiple devices (for example, collocated devices) operating with the xPAN may lead to increased interference (for example, collisions). Additionally, or alternatively, the multiple devices operating within the WLAN 400 (for example, the AP 402 and the STAs 404) may have stringent latency constraints (for example, key performance indicators (KPI) latency constraints), performance constraints, and power constraints in private area networks. As such, the multiple devices may not be capable of adapting to collocated networks (for example, collocated xPAN networks), in which Wi-Fi (for example, one or more Wi-Fi communication links) may be congested. That is, devices with stringent latency constraints may not be capable of adapting to congested Wi-Fi environments, such as airports, student lounges, gaming arcades, and sports arenas, among other examples.

For example, in the WLAN 400 (for example, an xPAN or an XR network), a mobile device (for example, a phone, the AP 402) may configure a wearable device (for example, one or both of the STAs 404, the pair of earphones 406, the pair of smart glasses 408), with an individual TWTs (iTWTs) sessions. In such an example, the iTWT session may be used for communications between the AP 402 and one or both of the STAs 404. That is, the iTWT session may be used for transmissions between a phone and a wearable device in an xPAN (or a phone and a wearable device in an XR network). In some examples, the iTWT session may aid in reducing (for example, to a minimum value or an otherwise suitable value) Wi-Fi collisions within a basic service set (BSS), such as a single xPAN including the phone (for example, the AP 402) and the associated wearable device (for example, the STAs 404), while providing a flexible service period or interval configuration (for example, to balance transmit power and latency). In some examples, the iTWT session may reduce collisions (for example, Wi-Fi collisions) by regulating collision from devices operating within the BSS. In some example, however, channel congestion from overlapping BSSs and non-Wi-Fi transmissions in a same band (for example, an industrial, scientific, and medical (ISM) band) may impact link quality. For example, an increased number of devices (for example, the STAs 404, the AP 402, or both) may be operating within the WLAN 400, such that channel congestion may be relatively high and the quality of the communications between the AP 402 and the STAs 404 (or between the STAs 404) may be reduced. In such an example, congestion avoidance techniques or detection and recovery techniques may be desirable.

In some examples, to reduce the likelihood of collisions occurring within the WLAN 400, the AP 402 may transmit an indication to the STA 404-a or the STA 404-b (or both) to switch operating frequencies (for example, switch to a different channel associated with a different operating frequency). For example, static frequency configurations for a network (for example, a Wi-Fi network in which the AP 402 and the STAs 404 may be operating) may lead to the network becoming more susceptible (for example, prone) to interference (for example, collisions). As such, some devices operating with the network, such as the AP 402, may detect (for example, determine) frequencies with increased congestion (for example, hotspots) and indicate for other devices (for example, the STAs 404) to switch frequencies, such that the network may recover and network operations (for example, a quality of communications within the network) may be maintained. In some examples, the AP 402 may indicate to the STAs 404 to switch frequencies via a CSA. For example, the AP 402 may transmit a CSA that may indicate for one or both of the STAs 404 to change a frequency or bandwidth used for communications within the WLAN 400. In some cases, however, the CSA may result in the AP 402 reinitiating a TWT session (for example, an iTWT session) to the STAs 404, which may lead to increased latency. Techniques that rely on a CSA to change operating frequencies may be rigid and not suitable for STAs 404 with stringent latency constraints.

In some examples, techniques for managing TWT sessions may provide one or more enhancements to xPANs and XR networks. For example, some techniques for managing TWT sessions may provide for frequency hopping for one or both of the STAs 404 across different channels based on channel congestion, thereby enabling the network to recover (for example, self-heal) and adapt to the congestion (for example, without relatively high control overhead). Some techniques for managing TWT session for wireless networks may be used with Wi-Fi, for example to aid congested xPANs (for example, one or more ad-hoc, self-managed networks without a centralized entity), such as in airports, auditoriums, sports arenas, student lounges, or gaming rooms, among other examples. For example, such techniques may employ frequency hopping (for example, in Wi-Fi), thereby providing one or more enhancements to congested or collocated networks. Additionally, or alternatively, techniques for managing TWT session for wireless networks may include flexible scheduling of TWT sessions, increased bandwidths (for example, about 20 MHz, about 10 MHz, or about 5 MHz) of Wi-Fi. Such techniques may provide for managing (for example, handling) congestion in collocated networks.

In some examples of techniques for managing TWT sessions for wireless networks, the AP 402 may associate a channel (or frequency and bandwidth) tuple for one or more negotiated TWT sessions. Additionally, or alternatively, some techniques for managing TWT sessions for wireless networks may provide a mechanism for the STAs 404 or the AP 402 (or both) to derive a hopping pattern with reduced overhead (for example, due to reduced message exchanges). For example, techniques for managing TWT sessions may provide a framework for identifying channels, bandwidths, and hopping patterns based on congestion metrics, thereby improving communications within the WLAN 400. In some examples, such techniques for managing TWT sessions may provide one or more enhancements to low-latency gaming and high-resolution lossless audio in xPAN.

As illustrated in the example of FIG. 4, the AP 402 may configure one or both of the STAs 404 to switch between frequency channels according to the frequency hopping pattern. In some examples, the STA 404-a and the STA 404-b may each receive a first signal (for example, a beacon) including an indication of a set of frequency channels for a set of TWT sessions that recur according to a service interval. For example, the STA 404-a may receive a frequency channel indication 410-a and the STA 404-b may receive a frequency channel indication 410-b. In some examples, the frequency channel indication 410-a and the frequency channel indication 410-b may indicate a respective frequency channel of the set of frequency channels for each TWT session of the set of TWT sessions. Additionally, or alternatively, each TWT session of the set of TWT sessions may be associated with a service period that the STAs 404 may be in an awake state.

In some examples, the STA 404-a and the STA 404-b may each receive the first signal over a first frequency channel. For example, the STA 404-a may receive the first signal (for example, including the frequency channel indication 410-a) over a first frequency channel 420-a and the STA 404-b may receive the first signal (for example, including the frequency channel indication 410-b) over a first frequency channel 420-b. In some examples, for a first TWT session and in accordance with the hopping pattern, the STA 404-a may switch from the first frequency channel 420-a to a second frequency channel 421-a and the STA 404-b may switch from the first frequency channel 420-b to a second frequency channel 421-b. In some examples, the STAs 404 may each communicate a signal during a service period associated with the first TWT session over the second frequency channel. For example, the STA 404-a may communicate a signal 415-a with (for example, transmit the signal to or receive the signal from) the AP 402 over the second frequency channel 421-a and the STA 404-b may communicate a signal 415-b with (for example, transmit the signal to or receive the signal from) the AP 402 over the second frequency channel 421-b. Additionally, or alternatively, the STA 404-a and the STA 404-b may communicate a signal 415-c between each other over a second frequency channel 421-c. In some examples, by switching frequency channels, the STAs 404 may reduce latency and the likelihood of collisions (for example, and glitching in audio) occurring for multiple (for example, different) congestion levels within the WLAN 400 (for example, a Wi-Fi system).

Figure 5:
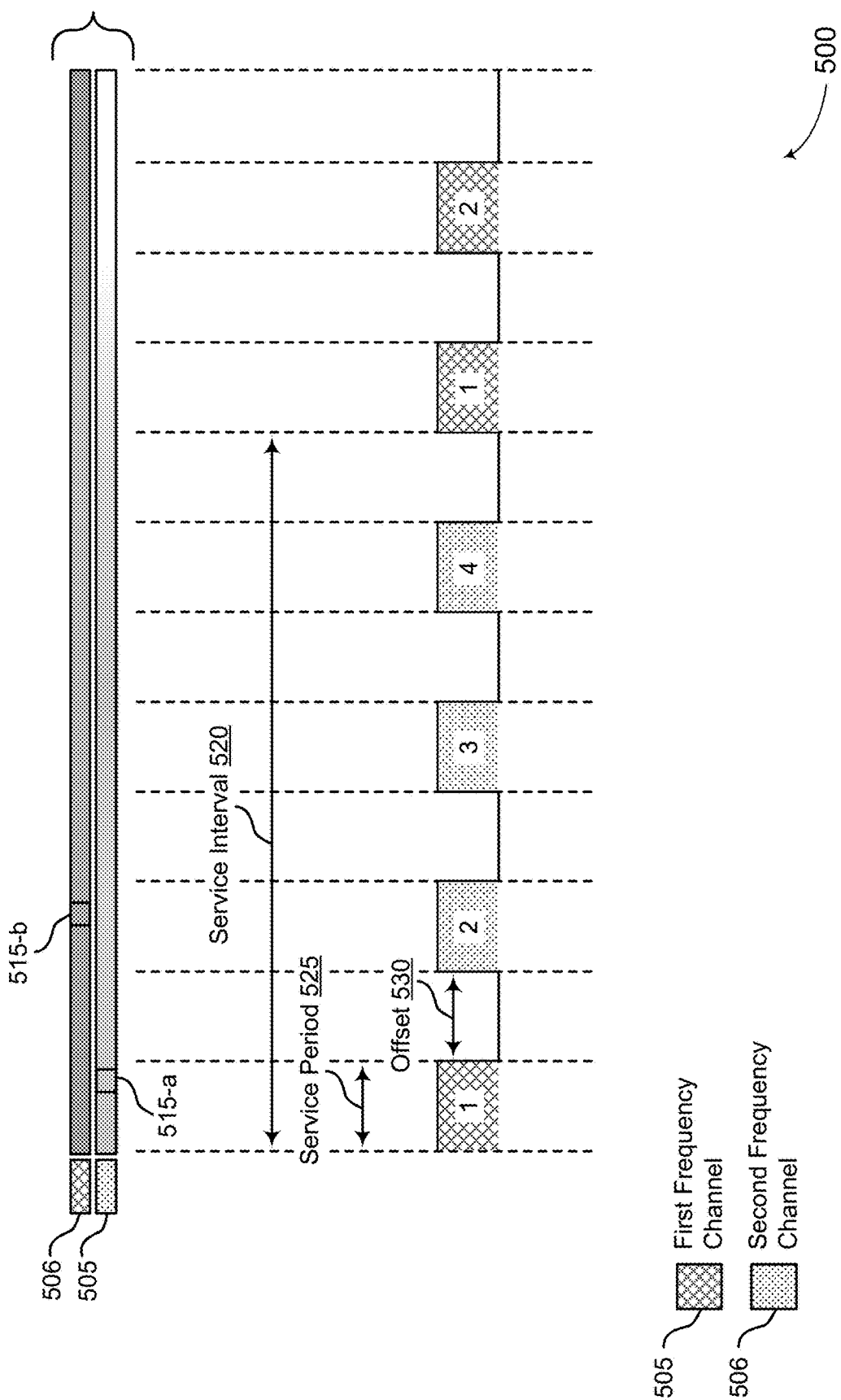
FIGS. 5 and 6 each illustrate an example of a frequency channel hopping scheme that supports managing hopping TWTs for wireless networks in accordance with one or more aspects of the present disclosure.

FIG. 5 illustrates an example of a frequency channel hopping scheme 500 that supports managing hopping TWTs for wireless networks in accordance with one or more aspects of the present disclosure. The frequency channel hopping scheme 500 may implement or be implemented by one or more aspects of the WLAN 100, the WLAN 200, the WLAN 300, and the WLAN 400. For example, the frequency channel hopping scheme 500 may be implemented by an AP and one or more STAs, which may be examples of the corresponding devices as described with reference to FIGS. 1-4. The one or more STAs may each be an example of a wearable device (for example, a pair of earphones or smart glasses) or a mobile device (for example, a UE). Additionally, or alternatively, the AP may be an example of a soft AP (for example, a UE operating in a mobile hotspot mode) or an infrastructure AP. Communications between the AP and the one or more STAs may be examples of communications between peer communication devices communicating over TWT sessions. In some examples, communications between the AP and the one or more STAs may be an example of communications between an infrastructure AP (for example, the AP, a device capable of forming a WLAN, a router) and clients (for example, the STAs, UEs) that are associated with the infrastructure AP and configured to communicate over the TWT sessions. Additionally, or alternatively, communications between the AP and the one or more STAs may be an example of communications between a soft AP (for example, the AP, a device capable of operating in a mobile hotspot mode, a UE) and clients (for example, the STAs, wearable devices) that are associated with the soft AP and part of the negotiated TWT sessions.

In some examples, the AP may manage communications within a wireless network (for example, an xPAN or an XR network) via TWT sessions. For example, the AP may configure a STA (or multiple STAs) served by the AP with multiple TWT sessions (for example, indexed from 1 to 4) that recur according to a service interval 520. Each TWT session may have an associated (for example, non-overlapping) time interval (for example, service periods 525) that the STA may communicate with the AP (for example, over which the STA may be in an awake state). In some examples, an offset 530 may occur between the service periods 525. Some TWT sessions may be negotiated between the AP and the STA, for example to provide a service period for uplink and downlink communications with an expected traffic. That is, the AP and the STA may negotiate multiple TWT sessions, such that the AP may communicate with the STA (or other communication devices) over multiple (for example, different) time intervals and with multiple (for example, different) traffic conditions. In some examples, the STA (for example, a TWT requesting and responding STA) may operate on a same (for example, static) frequency channel and bandwidth for all the negotiated sessions. In such an example, the STA may have an increased likelihood of (for example, may be prone to) experiencing channel interference.

In some examples, to reduce the likelihood of the STA experiencing channel interference (for example, to reduce the likelihood of collisions), the AP may configure the STA to switch operating frequencies (for example, switch channels associated with different operating frequencies). For example, the AP may indicate for the STAs to switch frequencies via a CSA. That is, a CSA may be used (for example, by the AP) to change operating frequency or bandwidth. In some examples, however, the CSA may result in one or more TWT sessions being reinitiated and, as such, may provide a coarse-level recovery for the network. For example, transmission of a CSA may lead to a breakdown (for example, tear down) of TWT sessions (for example, negotiated between the AP and the STA) and other (for example, subsequent) TWT sessions may be reinitiated on other (for example, a different) frequency channels. Additionally, or alternatively, to reduce the likelihood of the STA experiencing channel interference (for example, to reduce the likelihood of collisions occurring within the network), the AP may employ one or more congestion prevention schemes, such as overlapping BSS (OBSS) coloring, spatial reuse protocols, an energy (or packet) detection threshold, or relatively aggressive backoff parameters (for example, for each packet). In some examples, however, impacts of such techniques on the network may be unclear (for example, unknown).

In other examples, the AP may employ one or more techniques for managing TWT sessions. For example, the AP may associate a frequency (for example, a frequency and bandwidth tuple) for each TWT session negotiated with the STA (for example, for each TWT session indexed from 1 to 4). In some examples, the AP may define a frequency hopping pattern (for example, at a time instance synchronized with a TWT session boundary). The AP may determine to apply the frequency hopping pattern based on a congestion metric. For example, the AP may use a congestion metric-based hopping algorithm to determine a hop for a STA (for example, to indicate for the STA to change frequencies (for example, to change channels associated with different frequencies, to change frequency channels) according to the frequency hopping pattern) if a congestion condition is satisfied. For example, the AP may determine the frequency hopping pattern based on monitoring channel congestion over a duration of time for the set of frequency channels, which may range from relatively low congestion (for example, corresponding to a color 515-*b* of a channel condition trend 510) to relatively high congestion (for example, corresponding to a color 515-*a* of the channel condition trend 510). In some examples, such as in addition to the frequency channels included in the frequency hopping pattern, the AP may maintain a frequency channel for transmitting beacons and for other network operations, among other examples.

As illustrated in the example of FIG. 5, the STA may support frequency hopping, in which the STA may switch (for example, hop, transition) between multiple frequency channels (for example, multiple channels that may each be associated with a respective frequency) according to a frequency hopping pattern (for example, determined by the AP). For example, during a second session (for example, corresponding to an index of 2) of the service interval 520, the STA may be configured to operate over a second frequency channel 506. The AP may determine (for example, based on the frequency hopping pattern) to transmit an indication for the STA to switch, for the second session, from the second frequency channel 506 a first frequency channel 505. In response to the indication, the STA may switch, for the second session, from the second frequency channel 506 to the first frequency channel 505 during a subsequent (for example, a next) service interval. In some examples, a channel congestion associated with the first frequency channel 505 may be reduced compared to a channel congestion associated with the second frequency channel 506 for the second session of the subsequent (for example, next) service interval. As such, by switching to the first frequency channel 505 for the second session of the subsequent service interval, the STAs may reduce the likelihood of collisions occurring within the WLAN.

Figure 6:
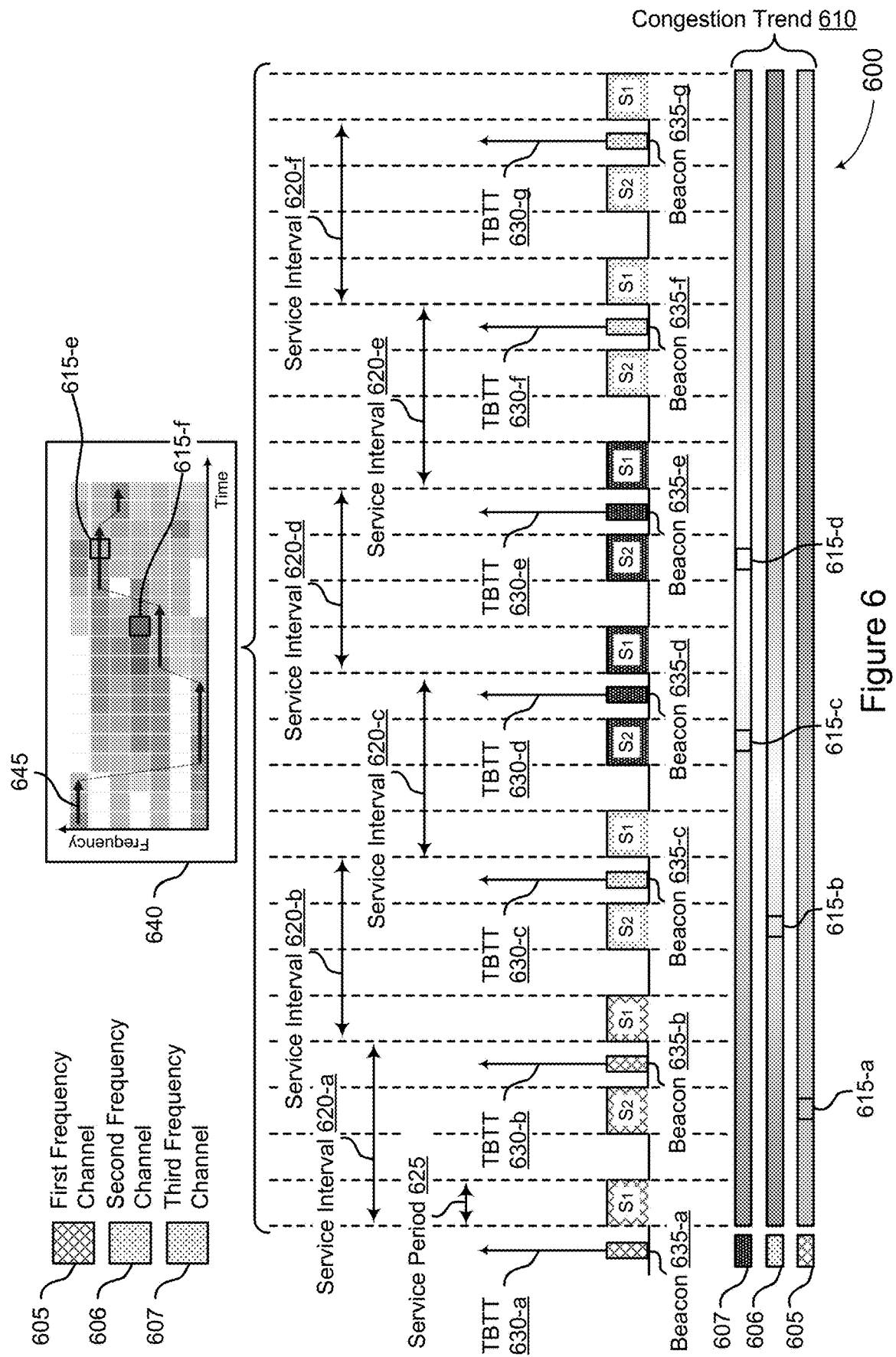

FIG. 6 illustrates an example of a frequency channel hopping scheme 600 that supports managing hopping TWTs for wireless networks in accordance with one or more aspects of the present disclosure. The frequency channel hopping scheme 600 may implement or be implemented by one or more aspects of the WLAN 100, the WLAN 200, the WLAN 300, and the WLAN 400. For example, the frequency channel hopping scheme 600 may be implemented by an AP and one or more STAs, which may be examples of the corresponding devices as described with reference to FIGS. 1-4. In the example of FIG. 6, the one or more STAs may each be an example of a wearable device (for example, a pair of earphones or smart glasses) or a mobile device (for example, a UE). Additionally, or alternatively, in the example of FIG. 6, the AP may be an example of a soft AP (for example, a UE operating in a mobile hotspot mode) or an infrastructure AP. For example, communications between the AP and one or multiple STAs may be examples of communications between peer communication devices communicating over TWT sessions. In some examples, communications between the AP and the STAs may be an example of communications between an infrastructure AP (for example, the AP, a device capable of forming a WLAN, a router) and clients (for example, the STAs, UEs) that are associated with the infrastructure AP and configured to communicate over the TWT sessions. Additionally, or alternatively, communications between the AP and the STAs may be an example of communications between a soft AP (for example, the AP, a device capable of operating in a mobile hotspot mode, a UE) and clients (for example, the STAs, wearable devices) that are associated with the soft AP and part of the negotiated TWT sessions.

In some examples, techniques for managing TWT sessions for wireless networks may provide for a STA to hop (for example, switch, transition) across different frequency channels for TWT sessions negotiated with an AP. For example, such techniques may enable the STA to avoid congestion and converges (for example, operate) on a frequency channel with relatively low congestion, thereby reducing the likelihood that the STA may incur hopping overhead unnecessarily. For example, a frequency hopping behavior of the STA may be based on channel congestion and aligned with service periods 625 of a TWT session. As illustrated in the example of FIG. 6, an AP may determine a hopping pattern 645 based on channel congestion (for example, a channel congestion condition) for multiple TWT sessions (for example, first session ($S_1$) and a second session ($S_2$)) negotiated with the STA. In some examples, each TWT session may recur according to a service interval 620 (for example, a service interval 620-*a*, a service interval 620-*b*, a service interval 620-*c*, a service interval 620-*d*, a service interval 620-*e*, a service interval 620-*f*) and may be associated with (for example, occur over) a respective service period 625.

In some examples, the AP may monitor one or more channel congestion metrics (for example, a latency metric, a throughput metric) of one or multiple frequency channels used for communications with the STA. Additionally or alternatively, the STA may monitor the one or more channel congestion metrics (for example, of the one or multiple frequency channels) and report (for example, transmit an indication of) the one or more channel metrics or information associated with the one or more channel metrics to the AP. That is, the STA may monitor (for example, and determine a local view of) the one or more congestion metrics to aid the AP in determining frequency channel congestion (e.g., a global view of frequency channel congestion) and, and such, a suitable frequency hopping pattern. In some examples, upon determining degradation of a frequency channel (for example, upon determining that the channel congestion condition is satisfied for a frequency channel, upon receiving an indication from the SA that the channel condition is satisfied), may initiate a hop sequence for the STA (for example, based on the determined hopping pattern). That is, upon determining that a channel congestion condition associated with a frequency channel of a TWT session is satisfied, the AP may indicate for the STA to switch (for example, hop, transition) from the frequency channel to another (for example, a different) frequency channel. In some examples, candidate frequency channels for hopping (for example, included in the hop sequence, included in the frequency hopping pattern) may be determined by the AP based on past results (for example, past measurement results, past results of a hopping algorithm at the AP), scans (for example, frequency scans), spectral data, or any combination thereof. For example, a hopping pattern 645 may be based on a channel congestion diagram 640, in which the hopping pattern may avoid (for example, refrain from including) frequency channels in which the congestion is relatively high (for example, corresponding to a color 615-*f*) and may include frequency channels in which the congestion may be relatively low (for example, corresponding to a color 615-*e*). In some examples, a frequency hop (for example, a next frequency channel) may be random (for example, based on a pseudo random seed) and triggered based on the channel congestion condition. That is, a frequency hop (for example, of the frequency hop sequence) may be opportunistic and conditioned on channel congestion.

In some examples, a frequency hop may be initiated for the STA via a beacon (for example, may be aligned with a beacon interval). For example, the AP may transmit an indication (for example, an out-of-band trigger) for the STA to switch from a frequency channel (for example, one of a first frequency channel 605, a second frequency channel 606, or a third frequency channel 607) to a another frequency channel (for example, another of the first frequency channel 605, the second frequency channel 606, or the third frequency channel 607) via a beacon 635 (for example, a beacon 635-*a*, a beacon 635-*b*, a beacon 635-*c*, a beacon 635-*d*, a beacon 635-*e*, a beacon 635-*f*, a beacon 635-*g*). In some examples, the beacon may be transmitted over a target beacon transmission time (TBTT), such as a TBTT 630-*a*, a TBTT 630-*b*, a TBTT 630-*c*, a TBTT 630-*d*, a TBTT 630-*e*, a TBTT 630-*f*, or a TBTT 630-*g*, during a respective service interval 620. As an illustrative example, the AP may transmit the beacon 635-*b* over the TBTT 630-*b*. The beacon 635-*b* may indicate for the STA to switch (for example, hop) from the first frequency channel 605 to the second frequency channel 606 for the second session ($S_2$) and a CSA (not shown) of the service interval 620-*b* (for example, a subsequent service interval, a next service interval). That is, the second frequency channel 606 may be chosen for both the CSA (for example, included in the beacon 635-*c* transmitted over the TBTT 630-*c*) and the second session ($S_2$) of the service interval 620-*b*.

In some examples, the second frequency channel 606 may be chosen for the second session ($S_2$) of the service interval 620-*b* based on the channel congestion condition. For example, as illustrated in accordance with a channel condition trend 610, during the service interval 620-*a*, a channel congestion (for example, illustrated by a color 615-*a*) associated with the first frequency channel 605 of the second session ($S_2$) may be relatively low. However, the AP may determine (for example, based on monitoring the channel congestion over a time duration) that a channel congestion associated with the first frequency channel 605 of the second session ($S_2$) during the service interval 620-*b* may be relatively high (or increased compared to the first frequency channel 605 of the second session ($S_2$) during the service interval 620-*a*). As such, the AP may indicate for the STA to switch from the first frequency channel 605 to the second frequency channel 606 for the second session ($S_2$) of the service interval 620-*b*.

Additionally, or alternatively, the AP may transmit the beacon 635-*c* over the TBTT 630-*c*. The beacon 635-*c* may indicate for the STA to switch (for example, hop) from the second frequency channel 606 to the third frequency channel 607 for the second session ($S_2$) and the CSA of the service interval 620-*c* (for example, a subsequent service interval, a next service interval). That is, the third frequency channel 607 may be chosen for both the CSA (for example, included in the beacon 635-*d* transmitted over the TBTT 630-*d*) and the second session ($S_2$) of the service interval 620-*c*. The third frequency channel 607 may be chosen for the second session ($S_2$) of the service interval 620-*c* based on the channel congestion condition. For example, during the service interval 620-*b*, a channel congestion (for example, illustrated by a color 615-*b*) associated with the second frequency channel 606 of the second session ($S_2$) may be relatively low, however, the AP may determine (for example, based on monitoring the channel congestion over a time duration) that a channel congestion associated with the second frequency channel 606 of the second session ($S_2$) during the service interval 620-*c* may be relatively high (or increased compared to the second frequency channel 606 of the second session ($S_2$) during the service interval 620-*b*). As such, the AP may indicate for the STA to switch from the second frequency channel 606 to the third frequency channel 607 for the second session ($S_2$) of the service interval 620-*c*.

In some examples, the AP may indicate to the STA to refrain from switching (for example, hopping) based on the channel congestion condition. For example, the AP may transmit the beacon 635-*d* over the TBTT 630-*d* that may indicate to the STA to refrain from switching (for example, hopping). That is, the third frequency channel 607 may be chosen for the CSA (for example, included in the beacon 635-*e* transmitted over the TBTT 630-*e*) and both the first session ($S_1$) and the second session ($S_2$) of the service interval 620-*d*. The third frequency channel 607 may be chosen for the second session ($S_2$) (for example, and the CSA, and the first session ($S_1$)) of the service interval 620-*d* based on the channel congestion condition. For example, during the service interval 620-*c* and the service interval 620-*d*, a channel congestion (for example, illustrated by a color 615-*c* and a color 615-*d*, respectively) associated with the third frequency channel 607 of the second session ($S_2$) may be relatively low and, as such, the AP may indicate to the STA to refrain from switching between frequency channels (for example, hopping, transitioning).

In some other examples, the AP may indicate for the STA to switch (for example, hop, transition) between frequency channels via a data signal, such as a quality of service data signal. For example, the AP may transmit a data signal during a session (for example, a first session ($S_1$) or a second session ($S_2$)) that may indicate for the STA to switch (or refrain from switching) between frequency channels for another service interval (for example, for a next TWT session period, a subsequent TWT session period). For example, the AP may transmit an indication (for example, an in-band trigger) over a second session ($S_2$) of the service interval 620-*a* for the STA to switch from the first frequency channel 605 to the second frequency channel 606 for a second session ($S_2$) of the service interval 620-*b*. In such an example, the AP may avoid increasing overhead associated with channel hopping unnecessarily.

Figure 7:
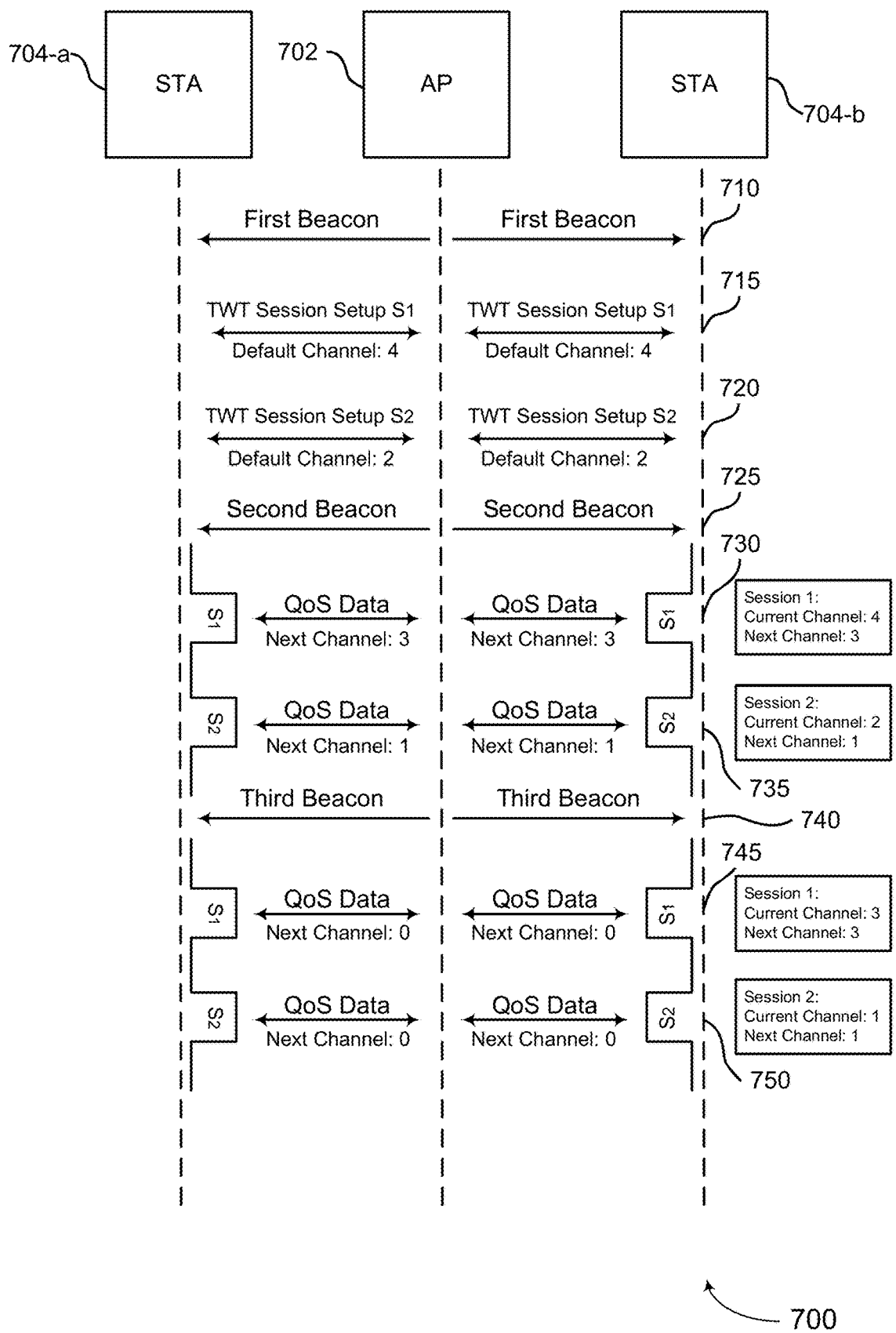
FIGS. 7 and 8 each illustrate an example of a process flow that supports managing hopping TWTs for wireless networks in accordance with one or more aspects of the present disclosure.

FIG. 7 illustrates an example of a process flow 700 that supports managing hopping TWTs for wireless networks in accordance with one or more aspects of the present disclosure. In some examples, the process flow 700 may include example operations associated with an AP 702 and one or more STAs 704 (for example, a STA 704-*a* and a STA 704-*b*), which may be examples of the corresponding devices as described with reference to FIGS. 1-6. In the example of FIG. 7, the one or more STAs 704 may each be an example of a wearable device (for example, a pair of earphones or smart glasses) or a mobile device (for example, a UE). Additionally, or alternatively, in the example of FIG. 7, the AP 702 may be an example of a soft AP (for example, a UE operating in a mobile hotspot mode) or an infrastructure AP. For example, communications between the AP 702 and the STAs 704 may be examples of communications between peer communication devices communicating over TWT sessions.

In some examples, communications between the AP 702 and the STAs 704 may be an example of communications between an infrastructure AP (for example, the AP 702, a device capable of forming a WLAN, a router) and clients (for example, the STAs 704, UEs) that are associated with the infrastructure AP and configured to communicate over the TWT sessions. Additionally, or alternatively, communications between the AP 702 and the STAs 704 may be an example of communications between a soft AP (for example, the AP 702, a device capable of operating in a mobile hotspot mode, a UE) and clients (for example, the STAs 704, wearable devices) that are associated with the soft AP and part of the negotiated TWT sessions. The operations performed by the AP 702 and the STAs 704 may support improvements to communications between one or both of the STAs 704 and the AP 702. In the following description of the process flow 700, operations between the STAs 704 and the AP 702 may occur in a different order or at different times than as shown. Some operations may also be omitted from the process flow 700, and other operations may be added to the process flow 700.

In some examples, an AP may serve multiple STAs (for example, multiple clients) over multiple sessions and multiple channels (for example, frequency channels). For example, the AP 702 may serve the STA 704-*a* and the STA 704-*b* (for example, dual clients). In some examples, the STAs 704 (for example, the dual clients) may each be an example of a wearable device. For example, the STAs 704 may be an example of a pair of earphones (for example, the STA 704-*a* may be an example of an earphone to be worn in a left ear of a user and the STA 704-*b* may be an example of an earphone to be worn in a right ear of the user). In some examples, the AP 702 may configure the STA 704-*a* and the STA 704-*b* with one or more TWT sessions for communicating with the AP 702 (or other APs, or other STAs). As illustrated in the example of FIG. 7, the AP 702 may transmit a beacon to the STA 704-*a* and the STA 704-*b* at 710. In some examples, the beacon may include a list of channels to be used by the STAs 704, for example over TWT sessions negotiated with the AP 702. That is, the AP 702 may announce a TWT channel list via one or more beacons. Additionally, or alternatively, the TWT channel list may be negotiated between the AP 702 and the STAs 704, for example over one or more frames used for establishing TWT sessions with the STAs 704 (for example, over session setup frames). For example, one or more packets including information elements (IEs) exchanged (for example, over the air (OTA)) between the AP 702 and the STAs 704 over frames used for establishing TWT sessions (for example, over a handshake for TWT sessions) may include information associated with the TW channel list. That is, an OTA frame exchange sequence between the AP 702 and one or both of the STAs 704 may include information regarding the TWT channel list, among other information associated with negotiated TWT sessions.

In some examples, in response to receiving a beacon transmitted at 710, the STAs 704 may establish (for example, set up, negotiate) respective TWT sessions with the AP 702. In some examples, as part of negotiating TWT sessions with the AP 702, the STAs 704 (for example, the dual clients, an earphone to be worn in a left ear and an earphone to be worn in a right ear) may be aligned at session boundaries. That is, the AP 702 may align TWT sessions configured for the STA 704-*a* with respective TWT sessions configured for the STA 704-*b*. In some examples, the AP 702 may align TWT sessions for the STAs 704 by applying a same service period offset, a same service period duration, or a same service interval, or any combination thereof. As such, the AP 702 may achieve synchronization between the STA 704-*a* and the STA 704-*b*. In some examples, the STAs 704 and the AP 702 may negotiate a default channel for communications over each of the sessions. For example, at 715, the AP 702 and the STAs 704 may determine a default channel for a first session ($S_1$) (for example, a channel indicated via an index of 4). At 720, the AP 702 and the STAs 704 may determine a default channel for a second session ($S_2$) (for example, a channel indicated via an index of 2). In some examples, the default channels may be included in the TWT channel list (for example, indicated to the STAs 704 via a beacon transmitted at 710). That is, each channel of the TWT channel list may be associated with an index that may be used by the AP 702 (or the STAs 704, or both) to identify (or indicate) a channel for communications.

At 725, the AP 702 may transmit a second beacon (for example, another beacon) to the STAs 704 (for example, over a TBTT) for a service interval that may include the first session ($S_1$) and the second session ($S_2$). In some examples, the beacon may include a TWT channel list (for example, a same or a different list as may be included in the beacon transmitted at 710). In some examples, the AP 702 may indicate for the STAs 704 to switch (or refrain from switching) from the default channel (for example, a frequency of a default channel) for the respective sessions to another channel (for example, another frequency) via the beacon transmitted at 725. In other examples, the AP 702 may indicate for the STAs 704 to switch (or refrain from switching) from the default channel associated with the first session ($S_1$) (for example, a frequency of a default channel) for the respective sessions via a data signal transmitted to the STAs 704 over the respective sessions. For example, at 730, the AP 702 may transmit a data signal, such as a QoS data signal, to the STAs 704 over the first session ($S_1$). The QoS may be transmitted over the default frequency associated with the first session ($S_1$) (for example, a channel corresponding to an index of 4). In some examples, the QoS data signal may indicate for the STA 704 to switch from the default channel to another channel (for example, a channel index corresponding to an index of 3). For example, the QoS data signal may include an indication of a next (for example, subsequent) channel to be used by the STAs 704 for a subsequent (for example, next) occurrence of the first session ($S_1$) (for example, over a subsequent service interval).

Additionally, or alternatively, at 735, the AP 702 may transmit another data signal, such as another QoS data signal, to the STAs 704 over the second session ($S_2$). The QoS may be transmitted over the default frequency associated with the second session ($S_2$) (for example, a channel corresponding to an index of 2). In some examples, the QoS data signal may indicate for the STAs 704 to switch (or refrain from switching) from the default channel associated with the second session ($S_2$) to another channel (for example, a channel index corresponding to an index of 1). For example, the QoS data signal may include an indication of a next (for example, subsequent) channel to be used by the STAs 704 for a subsequent (for example, next) occurrence of the first session ($S_1$) (for example, over a subsequent service interval). In some examples, the next channel (for example, the next channel index, a next channel indicator) may be indicated via one or more bits (for example, unused bits, null frames) in the QoS data signal (for example, a QoS data control signal). The QoS data signal may be an example of a downlink QoS data signal (for example, including audio data) or a QoS null signal (for example, for session period early termination). In such an example, the AP 702 may not incur additional overhead by transmitting the next channel indication via the QoS data signal.

The AP 702 may determine to trigger a frequency hop for the STAs 704 (for example, for the respective session) based on a congestion condition of the respective channel (for example, the default channels) for the first session ($S_1$) and the second session ($S_2$). In some examples, such as for a relatively clean environment (for example, for an environment with relatively low, no, or an otherwise suitable amount of congestion), the AP 702 may determine the next channel via a random seed (for example, via a pseudo random seed). In other examples, such as for a relatively congested environment (for example, for an environment with relatively high or an otherwise suitable amount of congestion), the AP 702 may determine the next channel based on channel congestion associated with each channel over a duration (for example, based on a channel congestion counter, a pseudo random seed, or both). For example, the AP 702 may determine a candidate channel for hopping based on data previously collected for the channels. In some examples, the AP 702 may determine a next channel based on a hopping pattern that may be determined by the AP 702 (or the STAs 704, or both) based on monitoring one or more channel congestion metrics for the channels over a duration. In some examples, the AP 702 may transmit an indication (for example, via the second beacon transmitted at 725) of the hopping pattern (for example, a frequency hopping pattern, a dynamic channel list) to the STAs 704 to indicate the next channel.

In some examples, in response to receiving the QoS data signals at 730 and 735, the STAs 704 may change (for example, switch, hop) channels (for example, frequency channels) for subsequent occurrences of the first session ($S_1$) and the second session ($S_2$), such as during a subsequent service interval. In some examples, by indicating to the STAs 704 to switch (for example, hop) channels, a signal strength (for example, signal strength measurements) of signals received by the STAs 704 may change (for example, vary) across the channels (for example, across a range of frequencies associated with the channels) that the STAs 704 may be switching (for example, hopping).

At 740, the AP 702 may transmit a third beacon (for example, another beacon) to the STAs 704 (for example, over a TBTT) for another (for example, a subsequent) service interval that may include the first session ($S_1$) and the second session ($S_2$). The third beacon may include a TWT channel list (for example, a dynamic channel lists, a frequency hopping pattern) that may be a same channel list or a different channel list as may be included in the second beacon transmitted at 725). In some examples, the AP 702 may indicate for the STAs 704 to switch (or refrain from switching) from the second channel (for example, a frequency of the second channel) for the respective sessions to another channel (for example, another frequency channel) via the third beacon transmitted at 740. In other examples, the AP 702 may indicate for the STAs 704 to switch (or refrain from switching) from the second channel via a QoS data signal transmitted to the STAs 704 over the respective sessions. For example, at 745, the AP 702 may transmit a QoS data signal to the STAs 704 over the first session ($S_1$). The QoS data signal may be transmitted over the second channel associated with the first session ($S_1$) (for example, a channel corresponding to an index of 3). In some examples, the QoS data signal may indicate for the STAs 704 to refrain from switch from the second channel to another channel. For example, the QoS data signal may include an indication of a channel index of zero (for example, the AP 702 may set a field of an IE used to indicate the next channel to zero), such that the STAs 704 may determine to refrain from switching between channels for a subsequent occurrence of the first session ($S_1$).

Additionally, or alternatively, at 750, the AP 702 may transmit another QoS data signal to the STAs 704 over the second session ($S_2$). The QoS data signal may be transmitted over the second frequency associated with the second session ($S_2$) (for example, a channel corresponding to an index of 1). In some examples, the QoS data signal may indicate for the STAs 704 to refrain from switching from the second channel associated with the second session ($S_2$) to another channel. For example, the QoS data signal may include an indication of a channel index of zero (for example, the AP 702 may set a field used to indicate the next channel to zero), such that the STAs 704 may determine to refrain from switching between channels for a subsequent occurrence of the second session ($S_2$).

In some examples, by enabling the STAs 704 to switch between channels (for example, hop frequencies), the AP 702 may provide one or more enhancements for packet exchange over TWT service periods (for example, sessions) between the STAs 704 (for example, a pair of earphones or smart glasses) and the AP 702 (for example, a UE) in xPAN and XR networks. That is, techniques for managing TWT sessions may provide one or more enhancements for point-to-point xPAN or XR network topologies (for example, including handset stock keeping units, handset hardware platforms).

Figure 8:
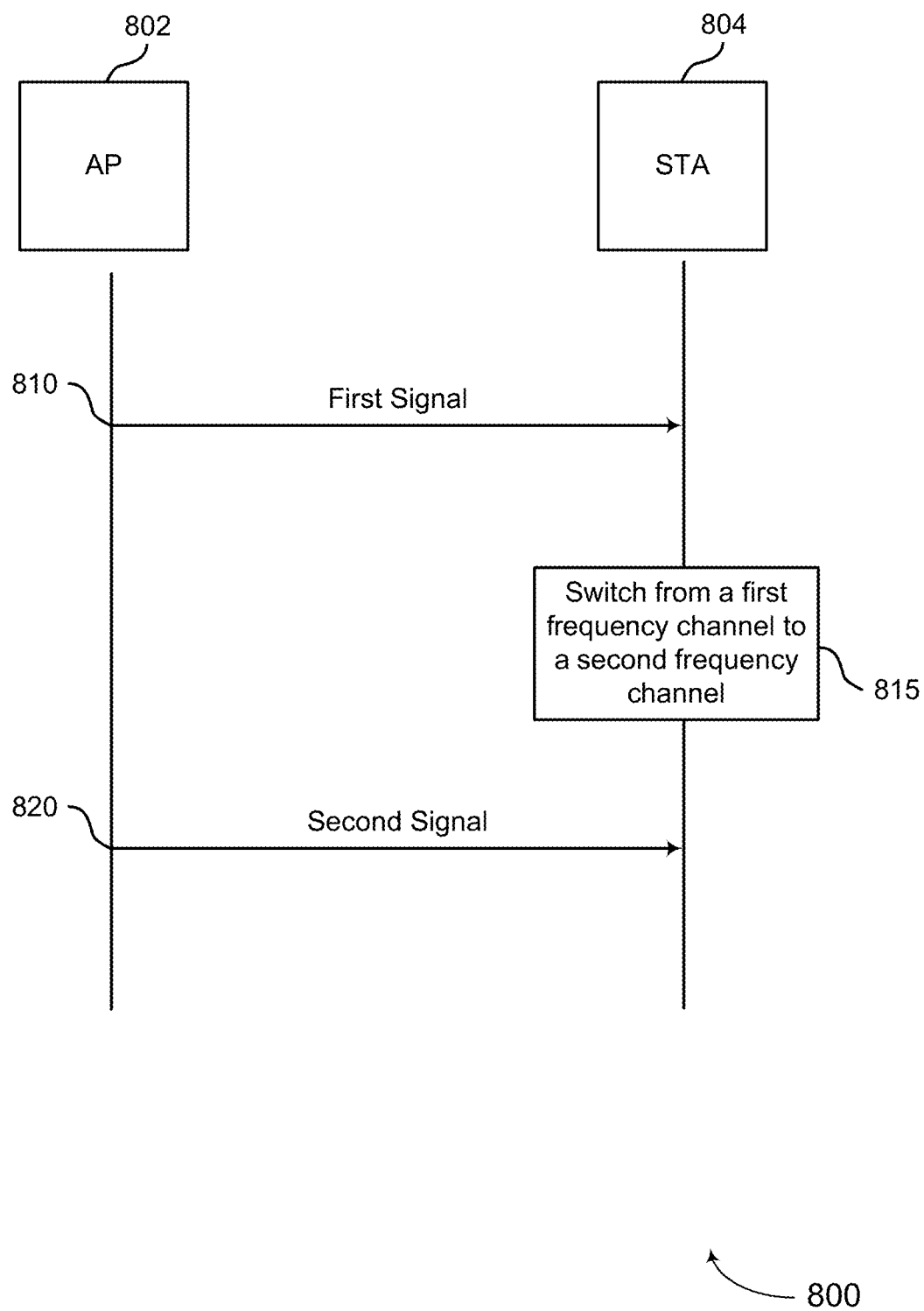

FIG. 8 illustrates an example of a process flow 800 that supports managing hopping TWTs for wireless networks in accordance with one or more aspects of the present disclosure. In some examples, the process flow 800 may include example operations associated with an AP 802 and a STA 804, which may be examples of the corresponding devices as described with reference to FIGS. 1-7. In the example of FIG. 8, the STA 804 may be an example of a wearable device (for example, an earphone or a pair of earphones or smart glasses) or a mobile device (for example, a UE). Additionally, or alternatively, in the example of FIG. 8, the AP 802 may be an example of a soft AP (for example, a UE operating in a mobile hotspot mode) or an infrastructure AP. For example, communications between the AP 802 and the STA 804 may be examples of communications between peer communication devices communicating over TWT sessions.

In some examples, communications between the AP 802 and the STA 804 may be an example of communications between an infrastructure AP (for example, the AP 802, a device capable of forming a WLAN, a router) and clients (for example, the STA 804, UEs) that are associated with the infrastructure AP and configured to communicate over the TWT sessions. Additionally, or alternatively, communications between the AP 802 and the STA 804 may be an example of communications between a soft AP (for example, the AP 802, a device capable of operating in a mobile hotspot mode, a UE) and clients (for example, the STA 804, wearable devices) that are associated with the soft AP and part of the negotiated TWT sessions. The operations performed by the AP 802 and the STA 804 may support improvements to communications between one or both of the STA 804 and the AP 802. In the following description of the process flow 800, operations between the STA 804 and the AP 802 may occur in a different order or at different times than as shown. Some operations may also be omitted from the process flow 800, and other operations may be added to the process flow 800.

In some examples, the AP 802 may configure the STA 804 to switch between frequency channels according to a frequency hopping pattern. For example, at 810, the STA 804 may receive a first signal (for example, a beacon signal) including an indication of a set of frequency channels for a set of TWT sessions that recur according to a service interval. In some examples, the first signal (for example, received by the STA 804 at 810) may indicate a respective frequency channel of the set of frequency channels for each TWT session of the set of TWT sessions. In some examples, each TWT session of the set of TWT sessions may be associated with a service period that the STA 804 may be (for example, may be expected to be) in an awake state.

At 815, the STA 804 may switch, for a first TWT session of the set of TWT sessions, from a first frequency channel indicated by the first signal to a second frequency channel in accordance with a frequency hopping pattern associated with the first TWT session. At 820, the STA 804 may communicate a second signal during a service period associated with the first TWT session over the second frequency channel based on the switching (for example, at 815). For example, the STA 804 may receive the second signal from the AP 802 over the second frequency channel. Additionally, or alternatively, the STA 804 may transmit the second signal to another STA (not shown). In some examples, by switching from the first frequency channel to the second frequency channel, the AP 802 may provide one or more enhancements to xPANs or XR networks.

Figure 9:
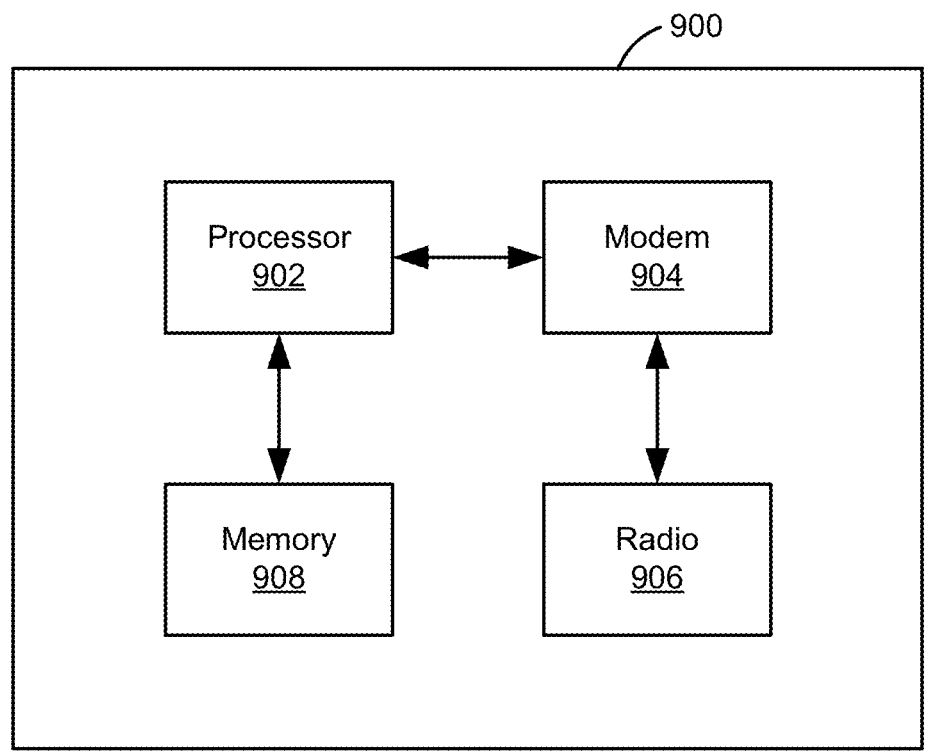
FIGS. 9, 10A, and 10B show block diagrams of devices that supports managing hopping TWTs for wireless networks in accordance with one or more aspects of the present disclosure.

FIG. 9 illustrates an example of a wireless communication device 900 that supports managing hopping TWTs for wireless networks in accordance with one or more aspects of the present disclosure. In some implementations, the wireless communication device 900 can be an example of a device for use in a STA such as one of the STAs 104 described above with reference to FIG. 1. In some implementations, the wireless communication device 900 can be an example of a device for use in an AP such as the AP 102 described above with reference to FIG. 1. The wireless communication device 900 is capable of transmitting and receiving wireless communications in the form of, for example, wireless packets. For example, the wireless communication device can be configured to transmit and receive packets in the form of physical layer convergence protocol (PLCP) protocol data units (PPDUs) and medium access control (MAC) protocol data units (MPDUs) conforming to an IEEE 802.11 wireless communication protocol standard, such as that defined by the IEEE 802.11-2016 specification or amendments thereof including, but not limited to, 802.11ay, 802.11ax, 802.11az, 802.11ba and 802.11be.

The wireless communication device 900 can be, or can include, a chip, system on chip (SoC), chipset, package or device that includes one or more modems 902, for example, a Wi-Fi (IEEE 802.11 compliant) modem. In some implementations, the one or more modems 902 (collectively "the modem 902") additionally include a WWAN modem (for example, a 3GPP 4G LTE or 5G compliant modem). In some implementations, the wireless communication device 900 also includes one or more processors, processing blocks or processing elements 904 (collectively "the processor 904") coupled with the modem 902. In some implementations, the wireless communication device 900 additionally includes one or more radios 906 (collectively "the radio 906") coupled with the modem 902. In some implementations, the wireless communication device 900 further includes one or more memory blocks or elements 908 (collectively "the memory 908") coupled with the processor 904 or the modem 902.

The modem 902 can include an intelligent hardware block or device such as, for example, an application-specific integrated circuit (ASIC) among other possibilities. The modem 902 is generally configured to implement a PHY layer, and in some implementations, also a portion of a MAC layer (for example, a hardware portion of the MAC layer). For example, the modem 902 is configured to modulate packets and to output the modulated packets to the radio 904 for transmission over the wireless medium. The modem 902 is similarly configured to obtain modulated packets received by the radio 904 and to demodulate the packets to provide demodulated packets. In addition to a modulator and a demodulator, the modem 902 may further include digital signal processing (DSP) circuitry, automatic gain control (AGC) circuitry, a coder, a decoder, a multiplexer and a demultiplexer. For example, while in a transmission mode, data obtained from the processor 906 may be provided to an encoder, which encodes the data to provide coded bits. The coded bits may then be mapped to a number $N_{SS}$ of spatial streams for spatial multiplexing or a number $N_{STS}$ of space-time streams for space-time block coding (STBC). The coded bits in the streams may then be mapped to points in a modulation constellation (using a selected MCS) to provide modulated symbols. The modulated symbols in the respective spatial or space-time streams may be multiplexed, transformed via an inverse fast Fourier transform (IFFT) block, and subsequently provided to the DSP circuitry (for example, for Tx windowing and filtering). The digital signals may then be provided to a digital-to-analog converter (DAC). The resultant analog signals may then be provided to a frequency upconverter, and ultimately, the radio 904. In implementations involving beamforming, the modulated symbols in the respective spatial streams are precoded via a steering matrix prior to their provision to the IFFT block.

While in a reception mode, the DSP circuitry is configured to acquire a signal including modulated symbols received from the radio 904, for example, by detecting the presence of the signal and estimating the initial timing and frequency offsets. The DSP circuitry is further configured to digitally condition the signal, for example, using channel (narrowband) filtering and analog impairment conditioning (such as correcting for I/Q imbalance), and by applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with a demultiplexer that demultiplexes the modulated symbols when multiple spatial streams or space-time streams are received. The demultiplexed symbols may be provided to a demodulator, which is configured to extract the symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits may then be descrambled and provided to the MAC layer (the processor 906) for processing, evaluation or interpretation.

The radio 904 generally includes at least one radio frequency (RF) transmitter (or "transmitter chain") and at least one RF receiver (or "receiver chain"), which may be combined into one or more transceivers. For example, each of the RF transmitters and receivers may include various analog circuitry including at least one power amplifier (PA) and at least one low-noise amplifier (LNA), respectively. The RF transmitters and receivers may, in turn, be coupled to one or more antennas. For example, in some implementations, the wireless communication device 900 can include, or be coupled with, multiple transmit antennas (each with a corresponding transmit chain) and multiple receive antennas (each with a corresponding receive chain). The symbols output from the modem 902 are provided to the radio 904, which then transmits the symbols via the coupled antennas. Similarly, symbols received via the antennas are obtained by the radio 904, which then provides the symbols to the modem 902.

The processor 906 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 906 processes information received through the radio 904 and the modem 902, and processes information to be output through the modem 902 and the radio 904 for transmission through the wireless medium. For example, the processor 906 may implement a control plane and at least a portion of a MAC layer configured to perform various operations related to the generation, transmission, reception and processing of MPDUs, frames or packets. In some implementations, the MAC layer is configured to generate MPDUs for provision to the PHY layer for coding, and to receive decoded information bits from the PHY layer for processing as MPDUs. The MAC layer may further be configured to allocate time and frequency resources, for example, for OFDMA, among other operations or techniques. In some implementations, the processor 906 may generally control the modem 902 to cause the modem to perform various operations described above.

The memory 904 can include tangible storage media such as random-access memory (RAM) or read-only memory (ROM), or combinations thereof. The memory 904 also can store non-transitory processor- or computer-executable software (SW) code containing instructions that, when executed by the processor 906, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

Figure 10B:
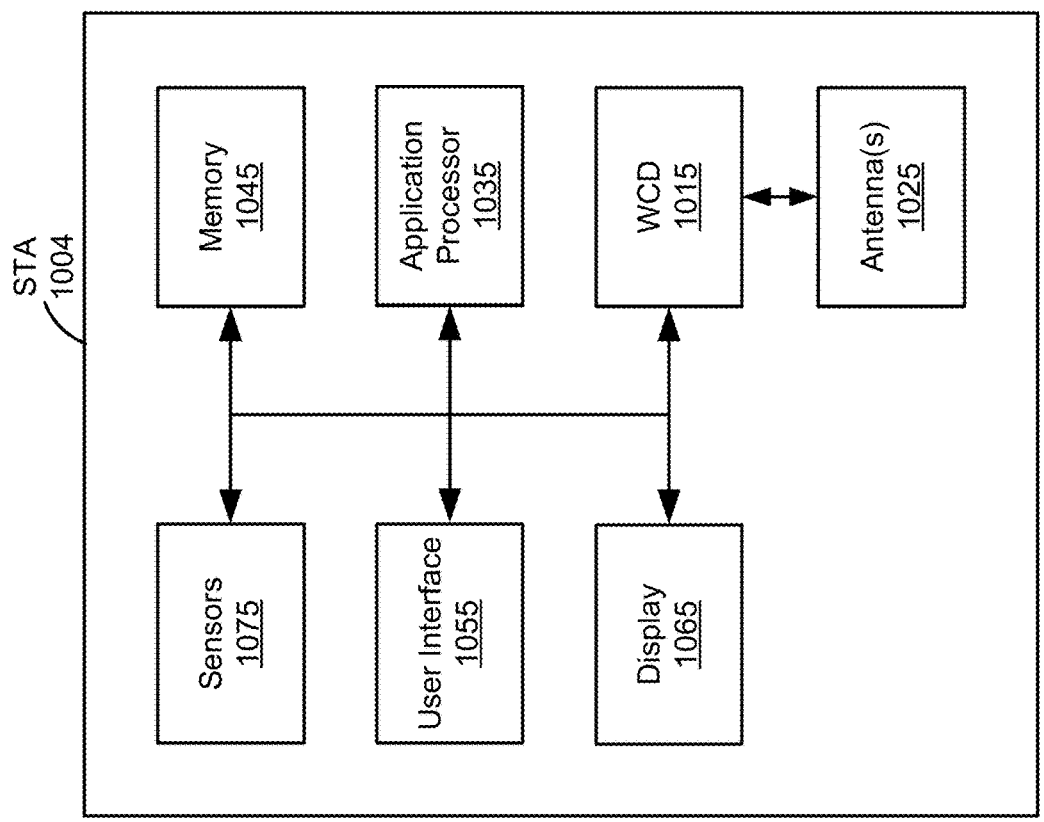
Figure 10A:
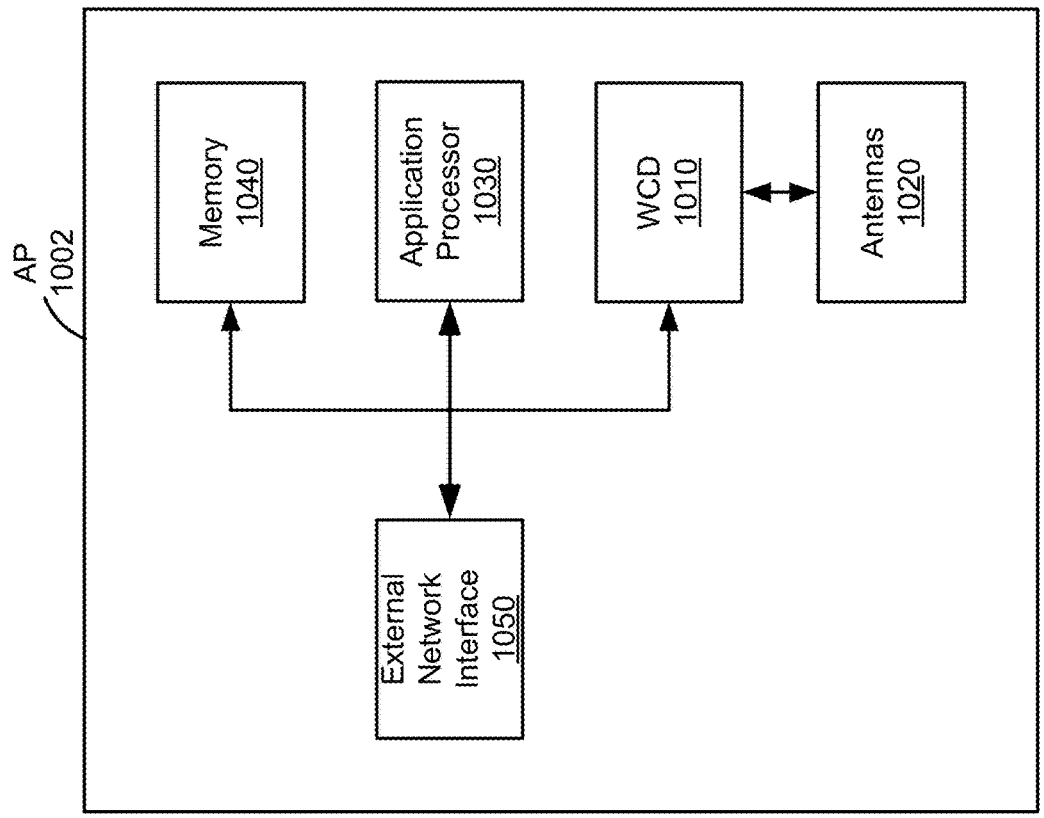

FIG. 10A illustrates an example of a wireless communication device that supports managing hopping TWTs for wireless networks in accordance with one or more aspects of the present disclosure. For example, the AP 1002 can be an example implementation of the AP 102 described with reference to FIG. 1. The AP 1002 includes a wireless communication device (WCD) 1010 (although the AP 1002 may itself also be referred to generally as a wireless communication device as used herein). For example, the wireless communication device 1010 may be an example implementation of the wireless communication device 900 described with reference to FIG. 9. The AP 1002 also includes multiple antennas 1020 coupled with the wireless communication device 1010 to transmit and receive wireless communications. In some implementations, the AP 1002 additionally includes an application processor 1030 coupled with the wireless communication device 1010, and a memory 1040 coupled with the application processor 1030. The AP 1002 further includes at least one external network interface 1050 that enables the AP 1002 to communicate with a core network or backhaul network to gain access to external networks including the Internet. For example, the external network interface 1050 may include one or both of a wired (for example, Ethernet) network interface and a wireless network interface (such as a WWAN interface). Ones of the aforementioned components can communicate with other ones of the components directly or indirectly, over at least one bus. The AP 1002 further includes a housing that encompasses the wireless communication device 1010, the application processor 1030, the memory 1040, and at least portions of the antennas 1020 and external network interface 1050.

FIG. 10B illustrates an example of a wireless communication device that supports managing hopping TWTs for wireless networks in accordance with one or more aspects of the present disclosure. For example, the STA 1004 can be an example implementation of the STA 104 described with reference to FIG. 1. The STA 1004 includes a wireless communication device 1015 (although the STA 1004 may itself also be referred to generally as a wireless communication device as used herein). For example, the wireless communication device 1015 may be an example implementation of the wireless communication device 900 described with reference to FIG. 9. The STA 1004 also includes one or more antennas 1025 coupled with the wireless communication device 1015 to transmit and receive wireless communications. The STA 1004 additionally includes an application processor 1035 coupled with the wireless communication device 1015, and a memory 1045 coupled with the application processor 1035. In some implementations, the STA 1004 further includes a user interface (UI) 1055 (such as a touchscreen or keypad) and a display 1065, which may be integrated with the UI 1055 to form a touchscreen display. In some implementations, the STA 1004 may further include one or more sensors 1075 such as, for example, one or more inertial sensors, accelerometers, temperature sensors, pressure sensors, or altitude sensors. Ones of the aforementioned components can communicate with other ones of the components directly or indirectly, over at least one bus. The STA 1004 further includes a housing that encompasses the wireless communication device 1015, the application processor 1035, the memory 1045, and at least portions of the antennas 1025, UI 1055, and display 1065.

Figure 11:
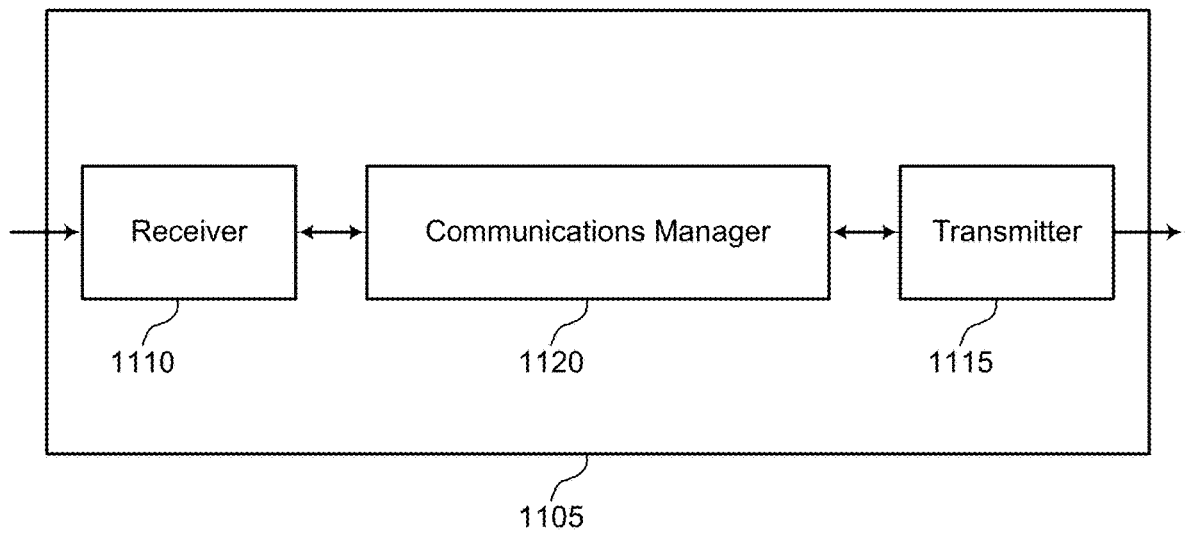
FIGS. 11 and 12 show block diagrams of devices that support managing hopping TWTs for wireless networks in accordance with one or more aspects of the present disclosure.

FIG. 11 shows a block diagram of a device 1105 that supports managing hopping TWTs for wireless networks in accordance with one or more aspects of the present disclosure. The device 1105 may be an example of aspects of a STA. The device 1105 may include a receiver 1110, a transmitter 1115, and a communications manager 1120. The communications manager 1120 can be implemented, at least in part, by one or both of a modem and a processor. Each of these components may be in communication with one another (for example, via one or more buses).

The receiver 1110 may provide a means for receiving information such as packets, user data, control information, or any combination thereof associated with various information channels (for example, control channels, data channels, information channels related to managing hopping TWTs for wireless networks). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (for example, control channels, data channels, information channels related to managing hopping TWTs for wireless networks). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of managing hopping TWTs for wireless networks. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (for example, in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (for example, by executing, by the processor, instructions stored in the memory).

In some examples, the communications manager 1120 may be configured to perform various operations (for example, receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations.

The communications manager 1120 may support wireless communication at a STA (for example, the device 1105) in accordance with examples as disclosed herein. For example, the communications manager 1120 may be configured as or otherwise support a means for receiving a first signal including an indication of a set of frequency channels for a set of TWT sessions that recur according to a service interval, the first signal indicating a respective frequency channel of the set of frequency channels for each TWT session of the set of TWT sessions, each TWT session of the set of TWT sessions having an associated service period during which the STA is expected to be in an awake state. The communications manager 1120 may be configured as or otherwise support a means for switching, for a first target waking time session of the set of TWT sessions, from a first frequency channel indicated by the first signal to a second frequency channel in accordance with a frequency hopping pattern associated with the first TWT session. The communications manager 1120 may be configured as or otherwise support a means for communicating a second signal during a service period associated with the first TWT session over the second frequency channel based on the switching.

By including or configuring the communications manager 1120 in accordance with examples as described herein, the device 1105 (for example, a processor controlling or otherwise coupled with the receiver 1110, the transmitter 1115, the communications manager 1120, or a combination thereof) may support techniques for reduced processing and more efficient utilization of communication resources.

Figure 12:
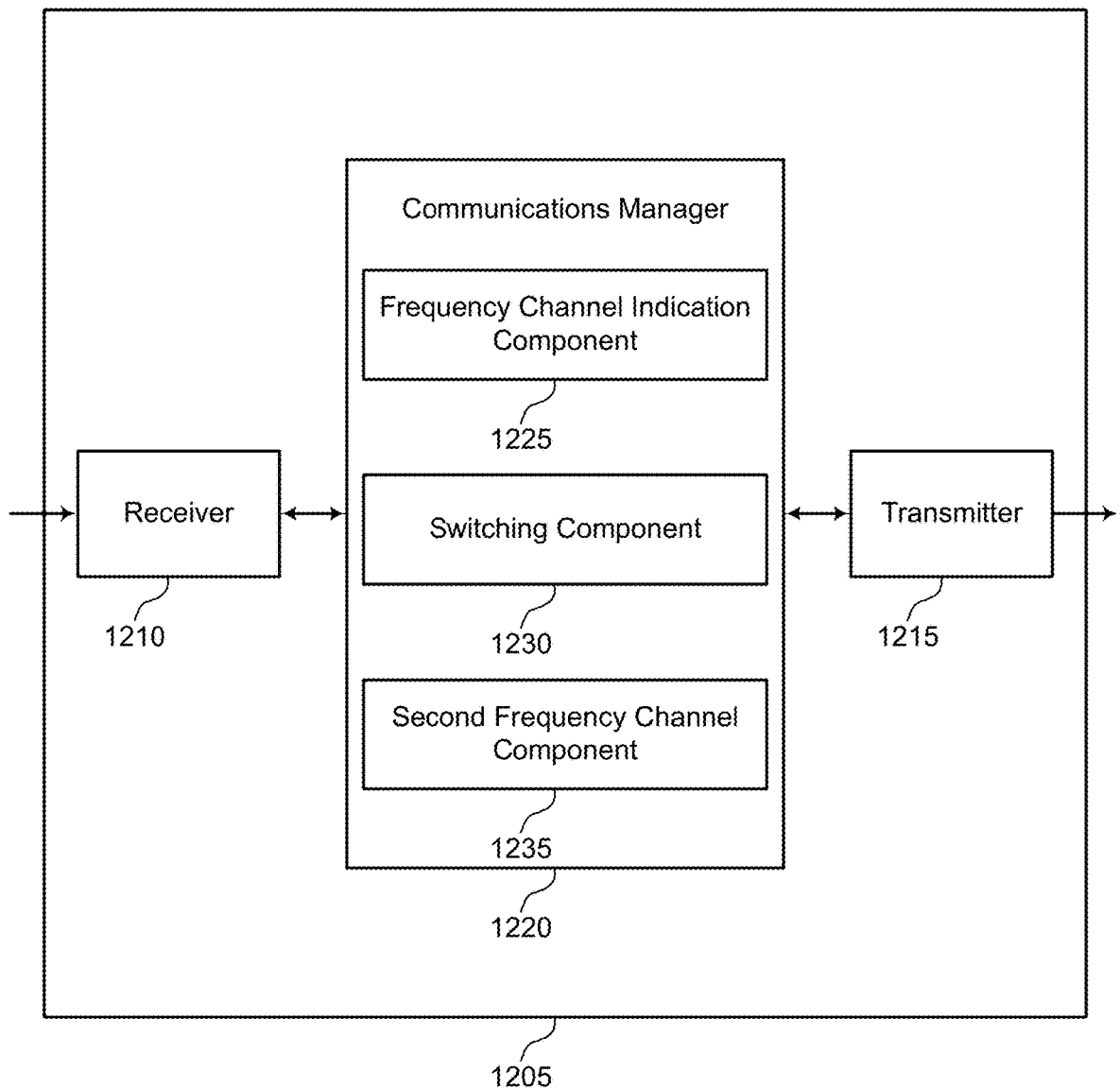

FIG. 12 shows a block diagram of a device 1205 that supports managing hopping TWTs for wireless networks in accordance with one or more aspects of the present disclosure. The device 1205 may be an example of aspects of a device 1105 or a STA 104. The device 1205 may include a receiver 1210, a transmitter 1215, and a communications manager 1220. The communications manager 1220 can be implemented, at least in part, by one or both of a modem and a processor. Each of these components may be in communication with one another (for example, via one or more buses).

The receiver 1210 may provide a means for receiving information such as packets, user data, control information, or any combination thereof associated with various information channels (for example, control channels, data channels, information channels related to managing hopping TWTs for wireless networks). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (for example, control channels, data channels, information channels related to managing hopping TWTs for wireless networks). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of managing hopping TWTs for wireless networks. For example, the communications manager 1220 may include a frequency channel indication component 1225, a switching component 1230, a second frequency channel component 1235, or any combination thereof. In some examples, the communications manager 1220, or various components thereof, may be configured to perform various operations (for example, receiving, obtaining, monitoring, outputting, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to obtain information, output information, or perform various other operations.

The communications manager 1220 may support wireless communication at a STA (for example, device 1205) in accordance with examples as disclosed herein. The frequency channel indication component 1225 may be configured as or otherwise support a means for receiving a first signal including an indication of a set of frequency channels for a set of TWT sessions that recur according to a service interval, the first signal indicating a respective frequency channel of the set of frequency channels for each TWT session of the set of TWT sessions, each TWT session of the set of TWT sessions having an associated service period during which the STA is expected to be in an awake state. The switching component 1230 may be configured as or otherwise support a means for switching, for a first TWT session of the set of TWT sessions, from a first frequency channel indicated by the first signal to a second frequency channel in accordance with a frequency hopping pattern associated with the first TWT session. The second frequency channel component 1235 may be configured as or otherwise support a means for communicating a second signal during a service period associated with the first TWT session over the second frequency channel based on the switching.

Figure 13:
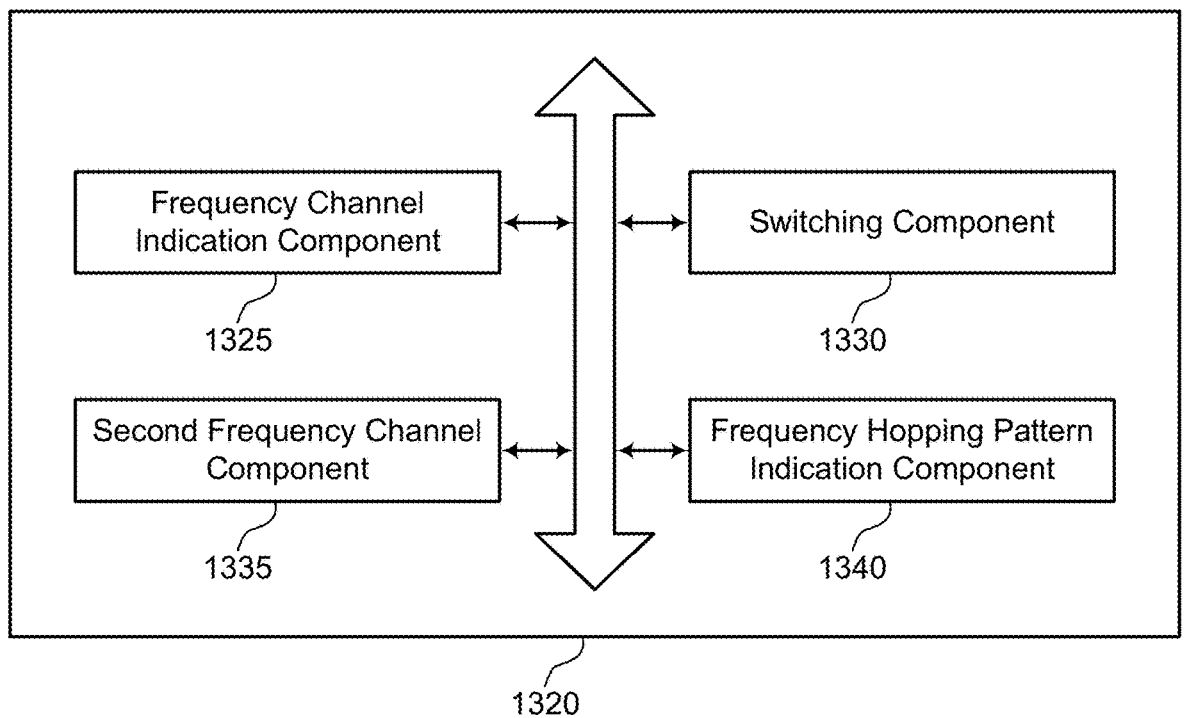
FIG. 13 shows a block diagram of a communications manager that supports managing hopping TWTs for wireless networks in accordance with one or more aspects of the present disclosure.

FIG. 13 shows a block diagram of a communications manager 1320 that supports managing hopping TWTs for wireless networks in accordance with one or more aspects of the present disclosure. The communications manager 1320, or various components thereof, may be an example of means for performing various aspects of managing hopping TWTs for wireless networks. For example, the communications manager 1320 may include a frequency channel indication component 1325, a switching component 1330, a second frequency channel component 1335, a frequency hopping pattern indication component 1340, or any combination thereof. Each of these components may communicate, directly or indirectly, with one another (for example, via one or more buses).

The communications manager 1320 may support wireless communication at a STA in accordance with examples as disclosed herein. The frequency channel indication component 1325 may be configured as or otherwise support a means for receiving a first signal including an indication of a set of frequency channels for a set of TWT sessions that recur according to a service interval, the first signal indicating a respective frequency channel of the set of frequency channels for each TWT session of the set of TWT sessions, each TWT session of the set of TWT sessions having an associated service period during which the STA is expected to be in an awake state. The switching component 1330 may be configured as or otherwise support a means for switching, for a first TWT session of the set of TWT sessions, from a first frequency channel indicated by the first signal to a second frequency channel in accordance with a frequency hopping pattern associated with the first TWT session. The second frequency channel component 1335 may be configured as or otherwise support a means for communicating a second signal during a service period associated with the first TWT session over the second frequency channel based on the switching.

In some examples, to support communicating the second signal, the second frequency channel component 1335 may be configured as or otherwise support a means for receiving, from an AP, the second signal during the service period associated with the first TWT session over the second frequency channel based on the switching. In some examples, to support communicating the second signal, the second frequency channel component 1335 may be configured as or otherwise support a means for transmitting, to another STA, the second signal during the service period associated with the first TWT session over the second frequency channel based on the switching.

In some examples, switching from the first frequency channel to the second frequency channel is based on a congestion condition associated with the first frequency channel. In some examples, the congestion condition includes a threshold latency metric or a threshold throughput metric. In some examples, switching from the first frequency channel to the second frequency channel is based on the threshold latency metric or the threshold throughput metric.

In some examples, the frequency hopping pattern indication component 1340 may be configured as or otherwise support a means for receiving a third signal including an indication of the frequency hopping pattern, in which switching from the first frequency channel to the second frequency channel is based on receiving the indication. In some examples, the third signal includes a beacon signal that includes the indication of the frequency hopping pattern. In some examples, the beacon signal is received by the STA prior to the service period associated with the first TWT session.

In some examples, the third signal includes a data signal that includes the indication of the frequency hopping pattern. In some examples, the data signal is received by the STA during a previous service period associated with the first TWT session prior to the service period. In some examples, the data signal includes a quality of service data signal that includes one or more bits indicating to the STA to switch from the first frequency channel to the second frequency channel.

In some examples, the second frequency channel component 1335 may be configured as or otherwise support a means for receiving an indication of the second frequency channel, in which switching from the first frequency channel to the second frequency channel is based on the received indication of the second frequency channel. In some examples, the indication of the second frequency channel includes a channel index corresponding to the second frequency channel. In some examples, switching from the first frequency channel to the second frequency channel is based on the channel index.

In some examples, the second frequency channel is based on data associated with the set of frequency channels and collected over a time duration prior to the first TWT session. In some examples, the second frequency channel is based on a pseudo random seed.

In some examples, the switching component 1330 may be configured as or otherwise support a means for receiving a third signal during the service period associated with the first TWT session over the second frequency channel based on the switching, the third signal indicating to the STA to refrain from switching from the second frequency channel for a subsequent service period associated with the first TWT session after the service period.

In some examples, each TWT session of the set of TWT sessions is aligned with a respective TWT session of a second set of TWT sessions associated with another STA. In some examples, at least one TWT session of the set of TWT sessions corresponds to a Wi-Fi connection between the STA and another STA. In some examples, the STA is operating within an extended personal area network or an extended reality network.

Figure 14:
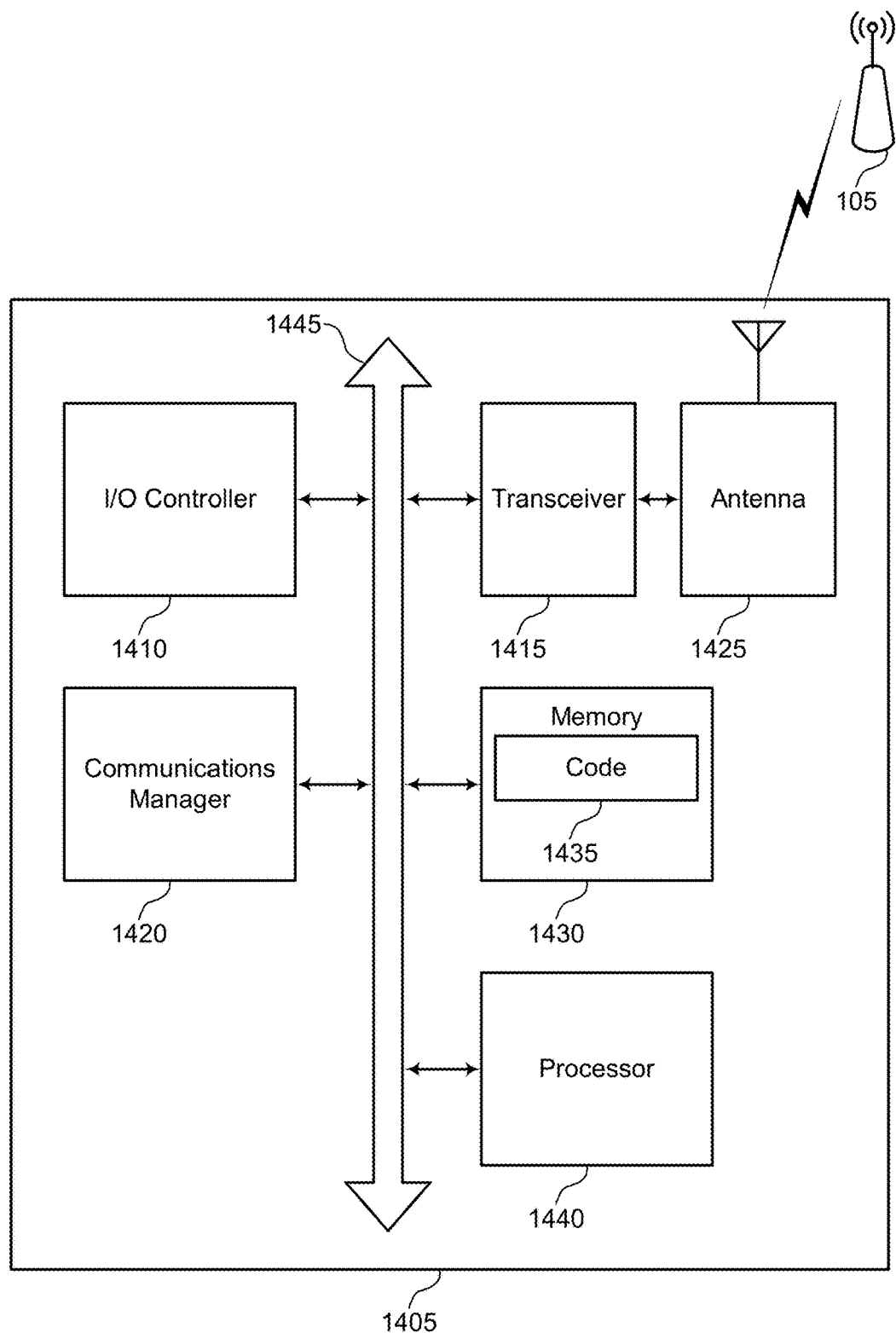
FIG. 14 shows a diagram of a system including a device that supports managing hopping TWTs for wireless networks in accordance with one or more aspects of the present disclosure.

FIG. 14 shows a diagram of a system including a device 1405 that supports managing hopping TWTs for wireless networks in accordance with one or more aspects of the present disclosure. The device 1405 may be an example of or include the components of a device 1105, a device 1205, or a STA. The device 1405 may include components for bi-directional voice and data communications including components for transmitting and receiving communications, such as a communications manager 1420, an I/O controller 1410, a transceiver 1415, an antenna 1425, a memory 1430, code 1435, and a processor 1440. These components may be in electronic communication or otherwise coupled (for example, operatively, communicatively, functionally, electronically, electrically) via one or more buses (for example, a bus 1445).

The I/O controller 1410 may manage input and output signals for the device 1405. The I/O controller 1410 may also manage peripherals not integrated into the device 1405. In some cases, the I/O controller 1410 may represent a physical connection or port to an external peripheral. In some cases, the I/O controller 1410 may utilize an operating system such as iOS®, ANDROID®, MS-DOS®, MS-WINDOWS®, OS/2®, UNIX®, LINUX®, or another known operating system. In some other cases, the I/O controller 1410 may represent or interact with a modem, a keyboard, a mouse, a touchscreen, or a similar device. In some cases, the I/O controller 1410 may be implemented as part of a processor, such as the processor 1440. In some cases, a user may interact with the device 1405 via the I/O controller 1410 or via hardware components controlled by the I/O controller 1410.

In some cases, the device 1405 may include a single antenna 1425. However, in some other cases the device 1405 may have more than one antenna 1425, which may be capable of concurrently transmitting or receiving multiple wireless transmissions. The transceiver 1415 may communicate bi-directionally, via the one or more antennas 1425, wired, or wireless links. For example, the transceiver 1415 may represent a wireless transceiver and may communicate bi-directionally with another wireless transceiver. The transceiver 1415 may also include a modem to modulate the packets and provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof.

The memory 1430 may include RAM and ROM. The memory 1430 may store computer-readable, computer-executable code 1435 including instructions that, when executed by the processor 1440, cause the device 1405 to perform various functions described herein. In some cases, the memory 1430 may contain, among other things, a BIOS which may control basic hardware or software operation such as the interaction with peripheral components or devices.

The processor 1440 may include an intelligent hardware device, (for example, a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (for example, the memory 1430) to cause the device 1405 to perform various functions (for example, functions or tasks supporting managing hopping TWTs for wireless networks). For example, the device 1405 or a component of the device 1405 may include a processor 1440 and memory 1430 coupled with or to the processor 1440, the processor 1440 and memory 1430 configured to perform various functions described herein.

The communications manager 1420 may support wireless communication at a STA (for example, the device 1405) in accordance with examples as disclosed herein. For example, the communications manager 1420 may be configured as or otherwise support a means for receiving a first signal including an indication of a set of frequency channels for a set of TWT sessions that recur according to a service interval, the first signal indicating a respective frequency channel of the set of frequency channels for each TWT session of the set of TWT sessions, each TWT session of the set of TWT sessions having an associated service period during which the STA is expected to be in an awake state. The communications manager 1420 may be configured as or otherwise support a means for switching, for a first target waking time session of the set of TWT sessions, from a first frequency channel indicated by the first signal to a second frequency channel in accordance with a frequency hopping pattern associated with the first TWT session. The communications manager 1420 may be configured as or otherwise support a means for communicating a second signal during a service period associated with the first TWT session over the second frequency channel based on the switching.

By including or configuring the communications manager 1420 in accordance with examples as described herein, the device 1405 may support techniques for improved user experience related to reduced processing, reduced power consumption, more efficient utilization of communication resources, and improved utilization of processing capability.

Figure 15:
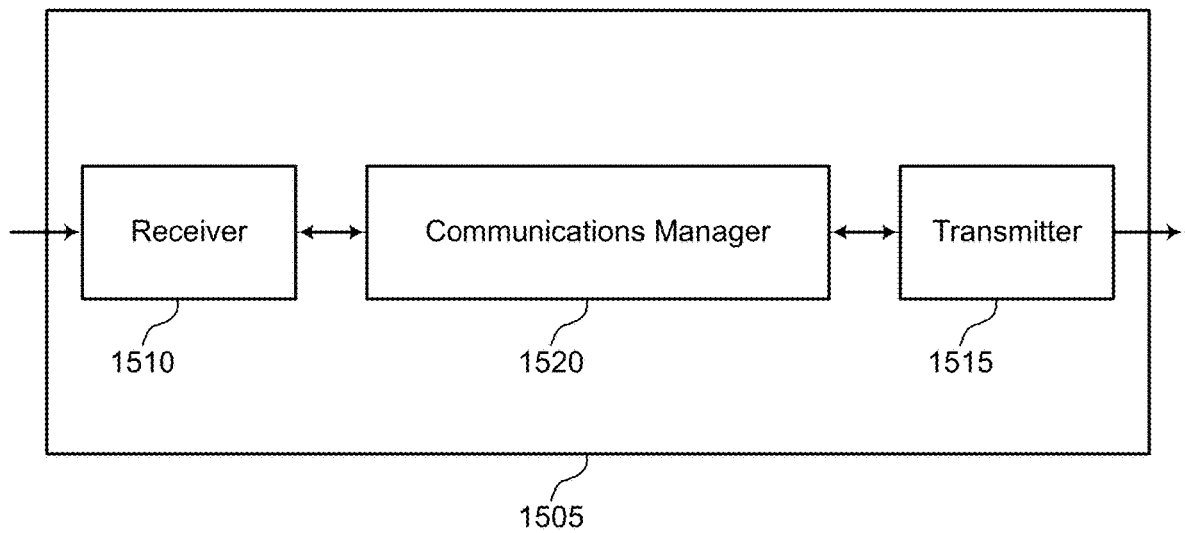
FIGS. 15 and 16 show block diagrams of devices that support managing hopping TWTs for wireless networks in accordance with one or more aspects of the present disclosure.

FIG. 15 shows a block diagram of a device 1505 that supports managing hopping TWTs for wireless networks in accordance with one or more aspects of the present disclosure. The device 1505 may be an example of aspects of an AP. The device 1505 may include a receiver 1510, a transmitter 1515, and a communications manager 1520. The communications manager 1520 can be implemented, at least in part, by one or both of a modem and a processor. Each of these components may be in communication with one another (for example, via one or more buses).

The receiver 1510 may provide a means for receiving information such as packets, user data, control information, or any combination thereof associated with various information channels (for example, control channels, data channels, information channels related to managing hopping TWTs for wireless networks). Information may be passed on to other components of the device 1505. The receiver 1510 may utilize a single antenna or a set of multiple antennas.

The transmitter 1515 may provide a means for transmitting signals generated by other components of the device 1505. The transmitter 1515 may utilize a single antenna or a set of multiple antennas.

The communications manager 1520, the receiver 1510, the transmitter 1515, or various combinations thereof or various components thereof may be examples of means for performing various aspects of managing hopping TWTs for wireless networks. For example, the communications manager 1520, the receiver 1510, the transmitter 1515, or various combinations or components thereof may support a method for performing one or more of the functions described herein.

In some examples, the communications manager 1520, the receiver 1510, the transmitter 1515, or various combinations or components thereof may be implemented in hardware (for example, in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (for example, by executing, by the processor, instructions stored in the memory).

In some examples, the communications manager 1520 may be configured to perform various operations (for example, receiving, obtaining, monitoring, outputting, transmitting) using or otherwise in cooperation with the receiver 1510, the transmitter 1515, or both. For example, the communications manager 1520 may receive information from the receiver 1510, send information to the transmitter 1515, or be integrated in combination with the receiver 1510, the transmitter 1515, or both to obtain information, output information, or perform various other operations.

The communications manager 1520 may support wireless communication at an AP (for example, the device 1505) in accordance with examples as disclosed herein. For example, the communications manager 1520 may be configured as or otherwise support a means for transmitting a first signal including an indication of a set of frequency channels for a set of TWT sessions that recur according to a service interval, the first signal indicating a respective frequency channel of the set of frequency channels for each TWT session of the set of TWT sessions, each TWT session of the set of TWT sessions having an associated service period during which a STA is expected to be in an awake state. The communications manager 1520 may be configured as or otherwise support a means for transmitting a second signal indicating to the STA to switch, for a first TWT session of the set of TWT sessions, from a first frequency channel indicated by the first signal to a second frequency channel in accordance with a frequency hopping pattern associated with the first TWT session. The communications manager 1520 may be configured as or otherwise support a means for communicating a third signal during a service period associated with the first TWT session over the second frequency channel.

By including or configuring the communications manager 1520 in accordance with examples as described herein, the device 1505 (for example, a processor controlling or otherwise coupled with the receiver 1510, the transmitter 1515, the communications manager 1520, or a combination thereof) may support techniques for reduced processing, reduced power consumption, and more efficient utilization of communication resources.

Figure 16:
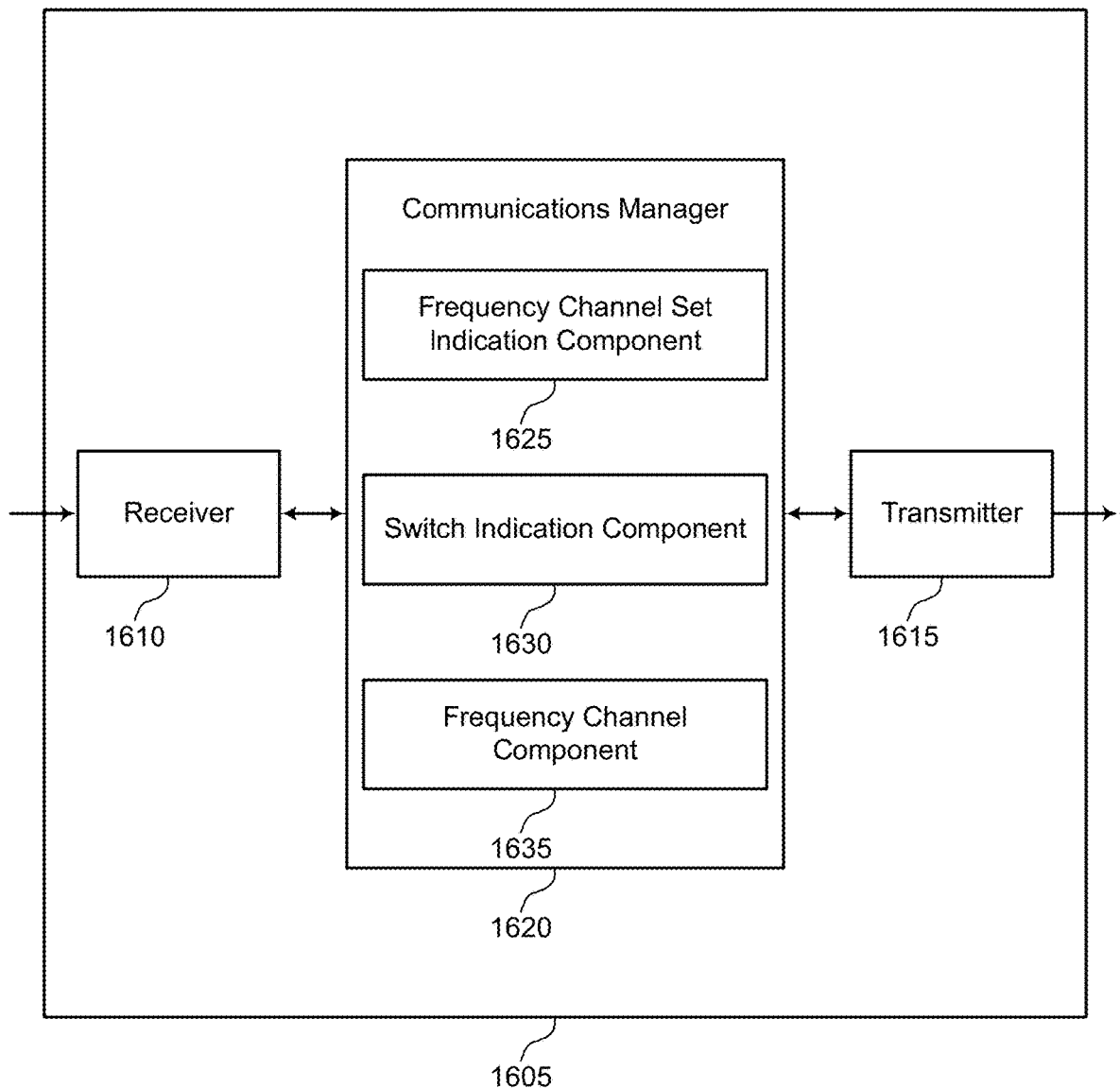

FIG. 16 shows a block diagram of a device 1605 that supports managing hopping TWTs for wireless networks in accordance with one or more aspects of the present disclosure. The device 1605 may be an example of aspects of a device 1505 or an AP 102. The device 1605 may include a receiver 1610, a transmitter 1615, and a communications manager 1620. The communications manager 1620 can be implemented, at least in part, by one or both of a modem and a processor. Each of these components may be in communication with one another (for example, via one or more buses).

The receiver 1610 may provide a means for receiving information such as packets, user data, control information, or any combination thereof associated with various information channels (for example, control channels, data channels, information channels related to managing hopping TWTs for wireless networks). Information may be passed on to other components of the device 1605. The receiver 1610 may utilize a single antenna or a set of multiple antennas.

The transmitter 1615 may provide a means for transmitting signals generated by other components of the device 1605. The transmitter 1615 may utilize a single antenna or a set of multiple antennas.

The device 1605, or various components thereof, may be an example of means for performing various aspects of managing hopping TWTs for wireless networks. For example, the communications manager 1620 may include a frequency channel set indication component 1625, a switch indication component 1630, a frequency channel component 1635, or any combination thereof. In some examples, the communications manager 1620, or various components thereof, may be configured to perform various operations (for example, receiving, obtaining, monitoring, outputting, transmitting) using or otherwise in cooperation with the receiver 1610, the transmitter 1615, or both. For example, the communications manager 1620 may receive information from the receiver 1610, send information to the transmitter 1615, or be integrated in combination with the receiver 1610, the transmitter 1615, or both to obtain information, output information, or perform various other operations.

The communications manager 1620 may support wireless communication at an AP (for example, device 1605) in accordance with examples as disclosed herein. The frequency channel set indication component 1625 may be configured as or otherwise support a means for transmitting a first signal including an indication of a set of frequency channels for a set of TWT sessions that recur according to a service interval, the first signal indicating a respective frequency channel of the set of frequency channels for each TWT session of the set of TWT sessions, each TWT session of the set of TWT sessions having an associated service period during which a STA is expected to be in an awake state. The switch indication component 1630 may be configured as or otherwise support a means for transmitting a second signal indicating to the STA to switch, for a first TWT session of the set of TWT sessions, from a first frequency channel indicated by the first signal to a second frequency channel in accordance with a frequency hopping pattern associated with the first TWT session. The frequency channel component 1635 may be configured as or otherwise support a means for communicating a third signal during a service period associated with the first TWT session over the second frequency channel.

Figure 17:
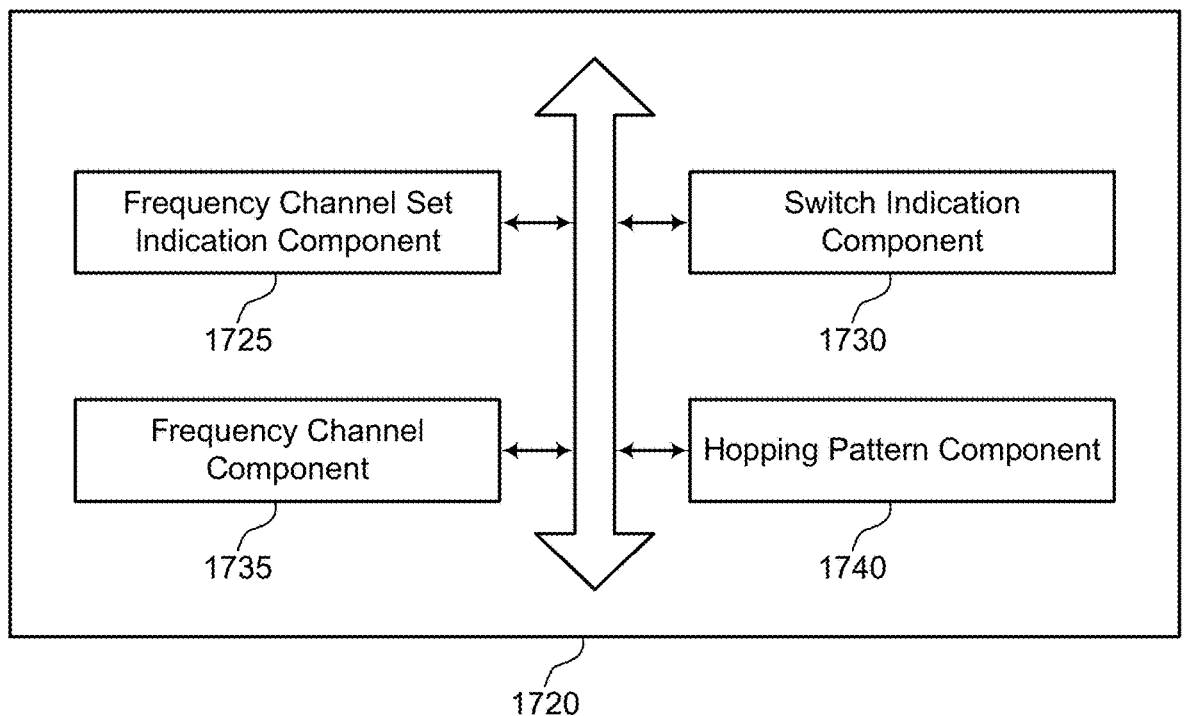
FIG. 17 shows a block diagram of a communications manager that supports managing hopping TWTs for wireless networks in accordance with one or more aspects of the present disclosure.

FIG. 17 shows a block diagram of a communications manager 1720 that supports managing hopping TWTs for wireless networks in accordance with one or more aspects of the present disclosure. The communications manager 1720, or various components thereof, may be an example of means for performing various aspects of managing hopping TWTs for wireless networks. For example, the communications manager 1720 may include a frequency channel set indication component 1725, a switch indication component 1730, a frequency channel component 1735, a hopping pattern component 1740, or any combination thereof. Each of these components may communicate, directly or indirectly, with one another (for example, via one or more buses).

The communications manager 1720 may support wireless communication at an AP in accordance with examples as disclosed herein. The frequency channel set indication component 1725 may be configured as or otherwise support a means for transmitting a first signal including an indication of a set of frequency channels for a set of TWT sessions that recur according to a service interval, the first signal indicating a respective frequency channel of the set of frequency channels for each TWT session of the set of TWT sessions, each TWT session of the set of TWT sessions having an associated service period during which a STA is expected to be in an awake state. The switch indication component 1730 may be configured as or otherwise support a means for transmitting a second signal indicating to the STA to switch, for a first TWT session of the set of TWT sessions, from a first frequency channel indicated by the first signal to a second frequency channel in accordance with a frequency hopping pattern associated with the first TWT session. The frequency channel component 1735 may be configured as or otherwise support a means for communicating a third signal during a service period associated with the first TWT session over the second frequency channel.

In some examples, the hopping pattern component 1740 may be configured as or otherwise support a means for determining the frequency hopping pattern based on monitoring channel congestion associated with the set of frequency channels, in which transmitting the second signal indicating to the STA to switch from the first frequency channel to the second frequency channel is based on determining the frequency hopping pattern.

In some examples, the second signal includes a beacon signal that includes the indication of the frequency hopping pattern. In some examples, the beacon signal is transmitted prior to the service period associated with the first TWT session. In some examples, the second signal includes a data signal that includes the indication of the frequency hopping pattern. In some examples, the data signal is transmitted during a previous service period associated with the first TWT session prior to the service period. In some examples, the data signal includes a quality of service data signal that includes one or more bits indicating to the STA to switch from the first frequency channel to the second frequency channel.

In some examples, to support transmitting the second signal indicating to the STA to switch from the first frequency channel to the second frequency channel, the frequency channel component 1735 may be configured as or otherwise support a means for transmitting an indication of the second frequency channel based on a congestion condition associated with the first frequency channel, in which transmitting the second signal is based on transmitting the indication.

In some examples, the indication of the second frequency channel includes a channel index corresponding to the second frequency channel. In some examples, the second frequency channel is based on data associated with the set of frequency channels and collected over a time duration prior to the first TWT session. In some examples, the second frequency channel is based on a pseudo random seed.

In some examples, the switch indication component 1730 may be configured as or otherwise support a means for transmitting a fourth signal during the service period associated with the first TWT session over the second frequency channel based on the switching, the third signal indicating to the STA to refrain from switching from the second frequency channel for a subsequent service period associated with the first TWT session after the service period.

In some examples, transmitting the second signal indicating to the STA to switch from the first frequency channel to the second frequency channel is based on a congestion condition. In some examples, the congestion condition includes a threshold latency metric or a threshold throughput metric. In some examples, each TWT session of the set of TWT sessions is associated with the STA and aligned with a respective TWT session of a second set of TWT sessions associated with a second STA.

In some examples, at least one TWT session of the set of TWT sessions corresponds to a Wi-Fi connection between the STA and another STA. In some examples, the AP is operating within an extended personal area network or an extended reality network.

Figure 18:
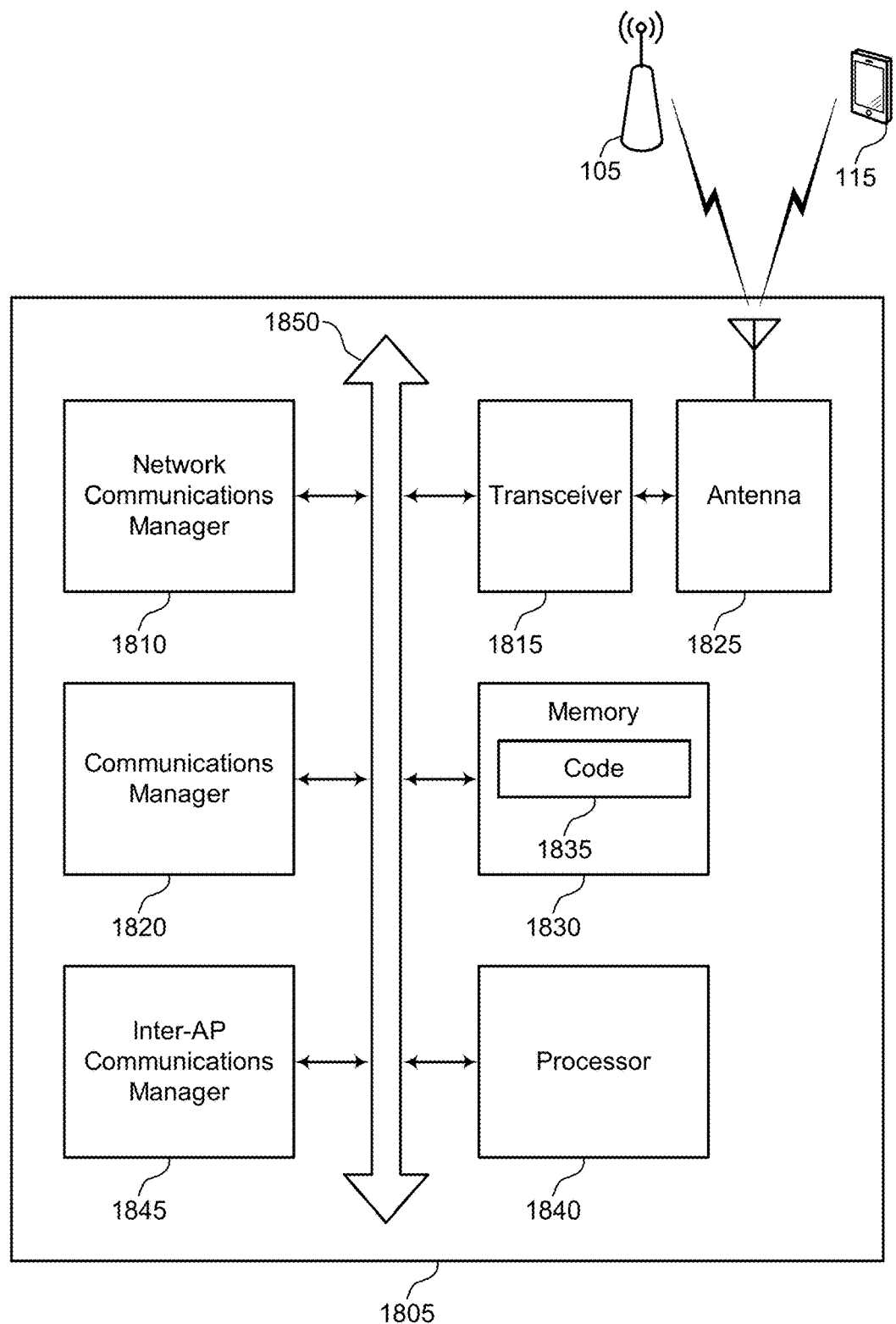
FIG. 18 shows a diagram of a system including a device that supports managing hopping TWTs for wireless networks in accordance with one or more aspects of the present disclosure.

FIG. 18 shows a diagram of a system including a device 1805 that supports managing hopping TWTs for wireless networks in accordance with one or more aspects of the present disclosure. The device 1805 may be an example of or include the components of a device 1505, a device 1605, or an AP. The device 1805 may include components for bi-directional voice and data communications including components for transmitting and receiving communications, such as a communications manager 1820, a network communications manager 1810, a transceiver 1815, an antenna 1825, a memory 1830, code 1835, a processor 1840, and an inter-AP communications manager 1845. These components may be in electronic communication or otherwise coupled (for example, operatively, communicatively, functionally, electronically, electrically) via one or more buses (for example, a bus 1850).

The network communications manager 1810 may manage communications with a core network (for example, via one or more wired backhaul links). For example, the network communications manager 1810 may manage the transfer of data communications for client devices, such as one or more STAs 115.

In some cases, the device 1805 may include a single antenna 1825. However, in some other cases the device 1805 may have more than one antenna 1825, which may be capable of concurrently transmitting or receiving multiple wireless transmissions. The transceiver 1815 may communicate bi-directionally, via the one or more antennas 1825, wired, or wireless links. For example, the transceiver 1815 may represent a wireless transceiver and may communicate bi-directionally with another wireless transceiver. The transceiver 1815 may also include a modem to modulate the packets and provide the modulated packets to one or more antennas 1825 for transmission, and to demodulate packets received from the one or more antennas 1825. The transceiver 1815, or the transceiver 1815 and one or more antennas 1825, may be an example of a transmitter 1515, a transmitter 1615, a receiver 1510, a receiver 1610, or any combination thereof or component thereof.

The memory 1830 may include RAM and ROM. The memory 1830 may store computer-readable, computer-executable code 1835 including instructions that, when executed by the processor 1840, cause the device 1805 to perform various functions described herein. In some cases, the memory 1830 may contain, among other things, a BIOS which may control basic hardware or software operation such as the interaction with peripheral components or devices.

The processor 1840 may include an intelligent hardware device, (for example, a general-purpose processor, a DSP, a CPU, a microcontroller, an ASIC, an FPGA, a programmable logic device, a discrete gate or transistor logic component, a discrete hardware component, or any combination thereof). In some cases, the processor 1840 may be configured to operate a memory array using a memory controller. In some other cases, a memory controller may be integrated into the processor 1840. The processor 1840 may be configured to execute computer-readable instructions stored in a memory (for example, the memory 1830) to cause the device 1805 to perform various functions (for example, functions or tasks supporting managing hopping TWTs for wireless networks). For example, the device 1805 or a component of the device 1805 may include a processor 1840 and memory 1830 coupled with or to the processor 1840, the processor 1840 and memory 1830 configured to perform various functions described herein.

The inter-station communications manager 1845 may manage communications with other APs 105, and may include a controller or scheduler for controlling communications with STAs 115 in cooperation with other APs 105. For example, the inter-station communications manager 1845 may coordinate scheduling for transmissions to APs 105 for various interference mitigation techniques such as beamforming or joint transmission. In some examples, the inter-station communications manager 1845 may provide an X2 interface within an LTE/LTE-A wireless communication network technology to provide communication between APs 105.

The communications manager 1820 may support wireless communication at an AP (for example, device 1805) in accordance with examples as disclosed herein. For example, the communications manager 1820 may be configured as or otherwise support a means for transmitting a first signal including an indication of a set of frequency channels for a set of TWT sessions that recur according to a service interval, the first signal indicating a respective frequency channel of the set of frequency channels for each TWT session of the set of TWT sessions, each TWT session of the set of TWT sessions having an associated service period during which a STA is expected to be in an awake state. The communications manager 1820 may be configured as or otherwise support a means for transmitting a second signal indicating to the STA to switch, for a first TWT session of the set of TWT sessions, from a first frequency channel indicated by the first signal to a second frequency channel in accordance with a frequency hopping pattern associated with the first TWT session. The communications manager 1820 may be configured as or otherwise support a means for communicating a third signal during a service period associated with the first TWT session over the second frequency channel based on the switching.

By including or configuring the communications manager 1820 in accordance with examples as described herein, the device 1805 may support techniques for improved communication reliability, reduced latency, improved user experience related to reduced processing, reduced power consumption, and improved utilization of processing capability.

Figure 19:
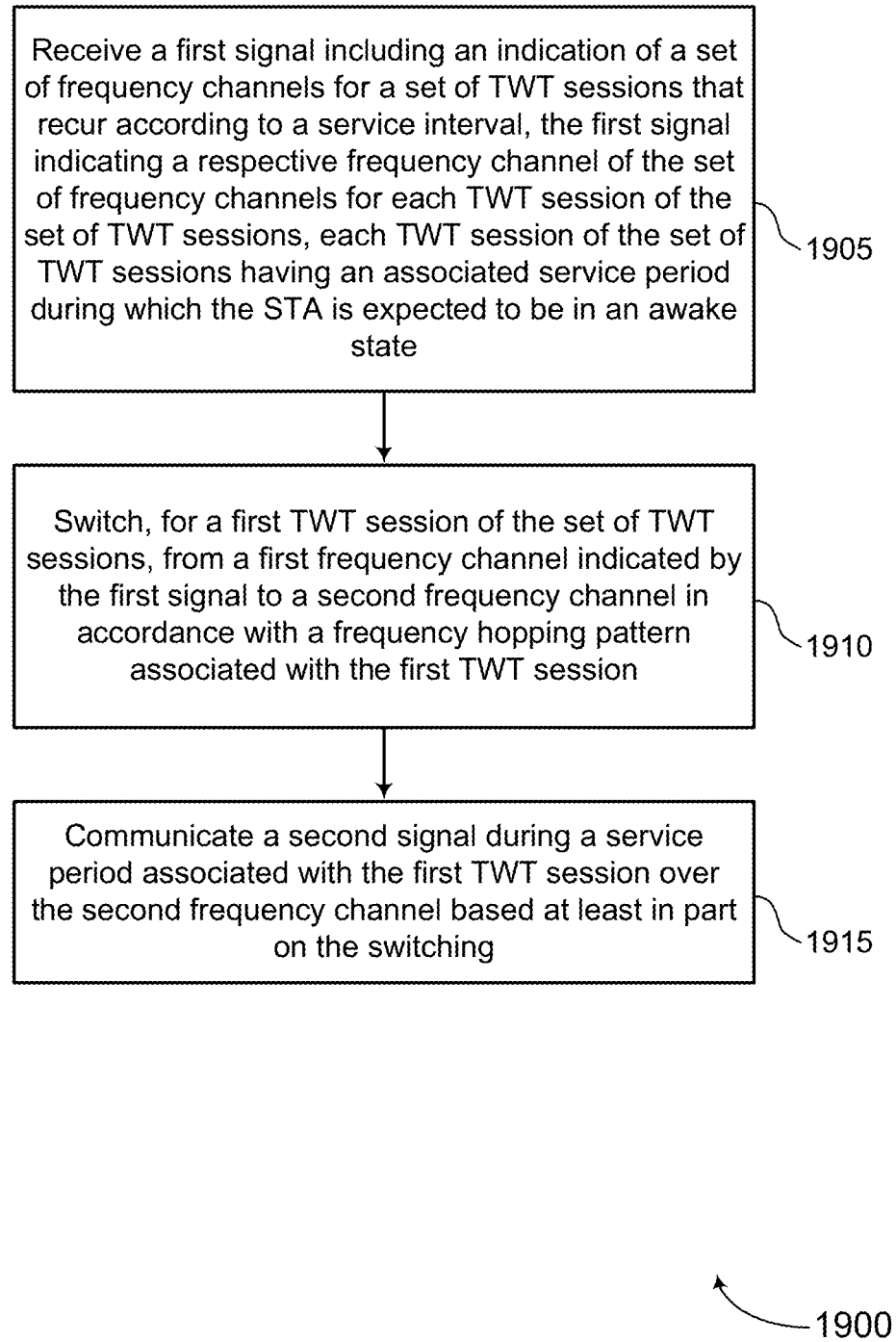
FIGS. 19-22 show flowcharts illustrating methods that support managing hopping TWTs for wireless networks in accordance with one or more aspects of the present disclosure.

FIG. 19 shows a flowchart illustrating a method 1900 that supports managing hopping TWTs for wireless networks in accordance with one or more aspects of the present disclosure. The operations of the method 1900 may be implemented by a STA or its components. For example, the operations of the method 1900 may be performed by a STA as described with reference to FIGS. 1-14. In some examples, a STA may execute a set of instructions to control the functional elements of the STA to perform the described functions. Additionally, or alternatively, the STA may perform aspects of the described functions using special-purpose hardware.

At 1905, the method may include receiving a first signal including an indication of a set of frequency channels for a set of TWT sessions that recur according to a service interval, the first signal indicating a respective frequency channel of the set of frequency channels for each TWT session of the set of TWT sessions, each TWT session of the set of TWT sessions having an associated service period during which the STA is expected to be in an awake state.

The operations of 1905 may be performed in accordance with examples as disclosed herein. In some examples, aspects of the operations of 1905 may be performed by a frequency channel indication component 1325 as described with reference to FIG. 13.

At 1910, the method may include switching, for a first TWT session of the set of TWT sessions, from a first frequency channel indicated by the first signal to a second frequency channel in accordance with a frequency hopping pattern associated with the first TWT session. The operations of 1910 may be performed in accordance with examples as disclosed herein. In some examples, aspects of the operations of 1910 may be performed by a switching component 1330 as described with reference to FIG. 13.

At 1915, the method may include communicating a second signal during a service period associated with the first TWT session over the second frequency channel based on the switching. The operations of 1915 may be performed in accordance with examples as disclosed herein. In some examples, aspects of the operations of 1915 may be performed by a second frequency channel component 1335 as described with reference to FIG. 13.

Figure 20:
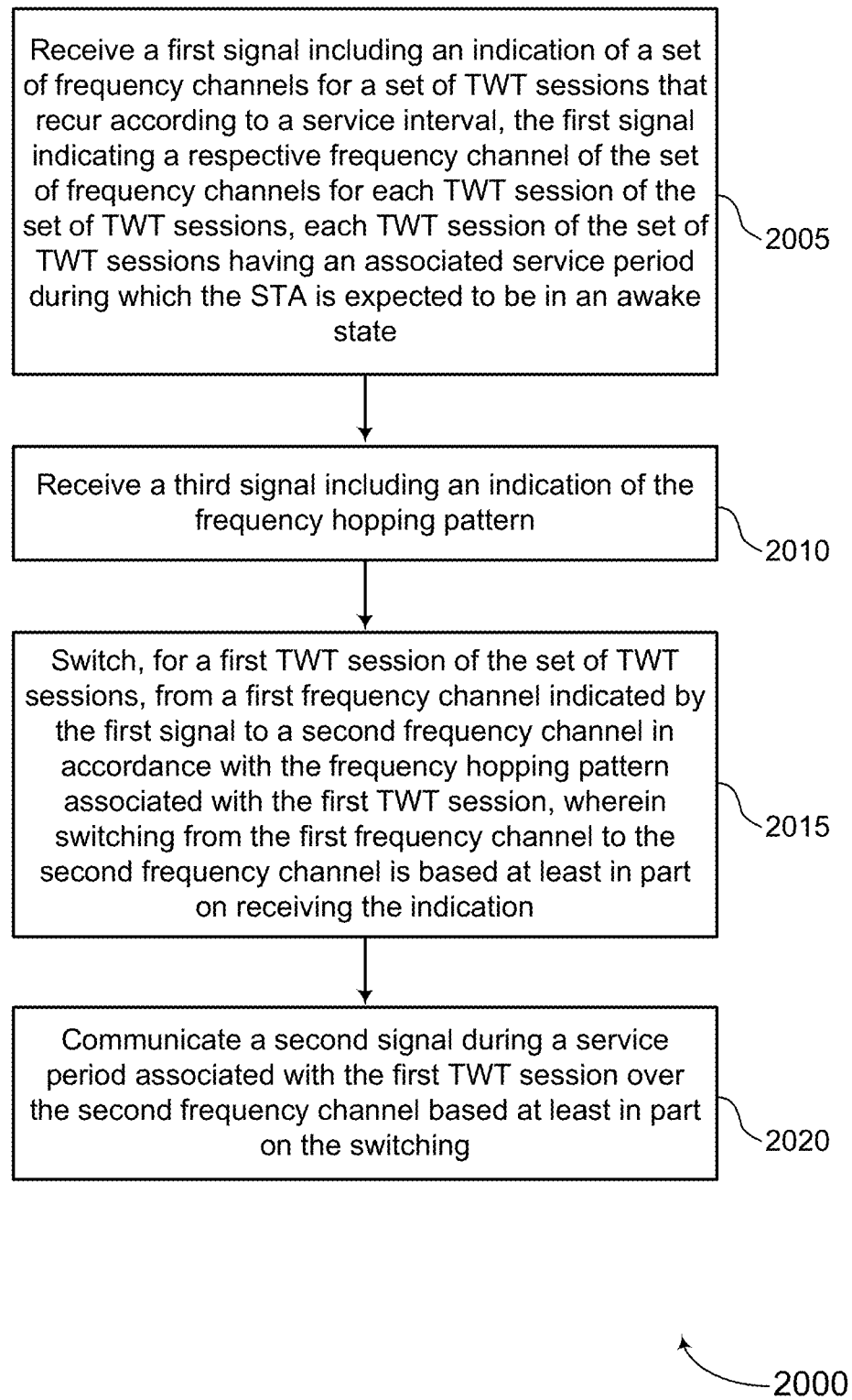

FIG. 20 shows a flowchart illustrating a method 2000 that supports managing hopping TWTs for wireless networks in accordance with one or more aspects of the present disclosure. The operations of the method 2000 may be implemented by a STA or its components. For example, the operations of the method 2000 may be performed by a STA as described with reference to FIGS. 1-14. In some examples, a STA may execute a set of instructions to control the functional elements of the STA to perform the described functions. Additionally, or alternatively, the STA may perform aspects of the described functions using special-purpose hardware.

At 2005, the method may include receiving a first signal including an indication of a set of frequency channels for a set of TWT sessions that recur according to a service interval, the first signal indicating a respective frequency channel of the set of frequency channels for each TWT session of the set of TWT sessions, each TWT session of the set of TWT sessions having an associated service period during which the STA is expected to be in an awake state. The operations of 2005 may be performed in accordance with examples as disclosed herein. In some examples, aspects of the operations of 2005 may be performed by a frequency channel indication component 1325 as described with reference to FIG. 13.

At 2010, the method may include receiving a third signal including an indication of the frequency hopping pattern. The operations of 2010 may be performed in accordance with examples as disclosed herein. In some examples, aspects of the operations of 2010 may be performed by a frequency hopping pattern indication component 1340 as described with reference to FIG. 13.

At 2015, the method may include switching, for a first TWT session of the set of TWT sessions, from a first frequency channel indicated by the first signal to a second frequency channel in accordance with the frequency hopping pattern associated with the first TWT session, in which switching from the first frequency channel to the second frequency channel is based on receiving the indication. The operations of 2015 may be performed in accordance with examples as disclosed herein. In some examples, aspects of the operations of 2015 may be performed by a switching component 1330 as described with reference to FIG. 13.

At 2020, the method may include communicating a second signal during a service period associated with the first TWT session over the second frequency channel based on the switching. The operations of 2020 may be performed in accordance with examples as disclosed herein. In some examples, aspects of the operations of 2020 may be performed by a second frequency channel component 1335 as described with reference to FIG. 13.

Figure 21:
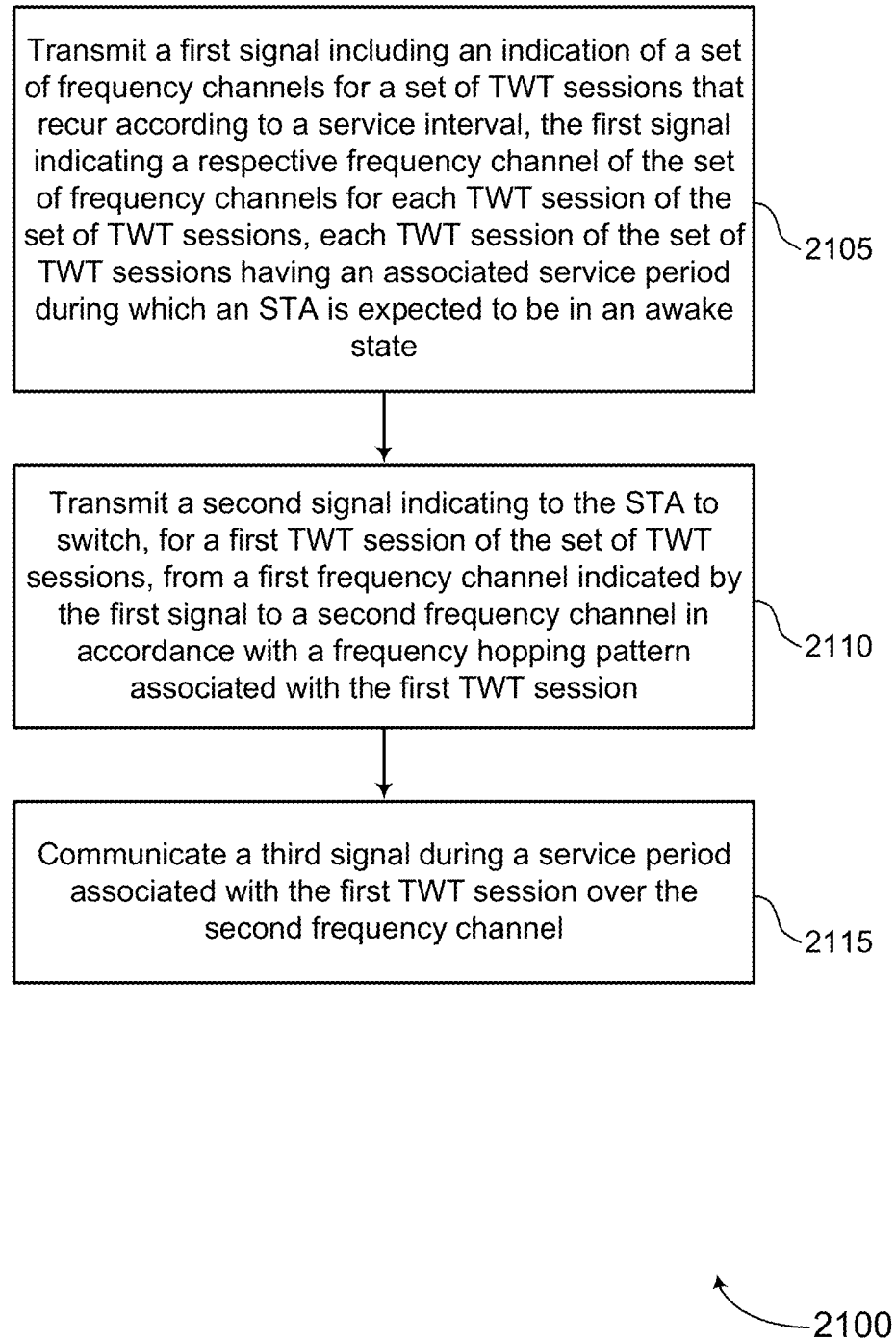

FIG. 21 shows a flowchart illustrating a method 2100 that supports managing hopping TWTs for wireless networks in accordance with one or more aspects of the present disclosure. The operations of the method 2100 may be implemented by an AP or its components. For example, the operations of the method 2100 may be performed by an AP as described with reference to FIGS. 1-10 and 15-18. In some examples, an AP may execute a set of instructions to control the functional elements of the AP to perform the described functions. Additionally, or alternatively, the AP may perform aspects of the described functions using special-purpose hardware.

At 2105, the method may include transmitting a first signal including an indication of a set of frequency channels for a set of TWT sessions that recur according to a service interval, the first signal indicating a respective frequency channel of the set of frequency channels for each TWT session of the set of TWT sessions, each TWT session of the set of TWT sessions having an associated service period during which a STA is expected to be in an awake state. The operations of 2105 may be performed in accordance with examples as disclosed herein. In some examples, aspects of the operations of 2105 may be performed by a frequency channel set indication component 1725 as described with reference to FIG. 17.

At 2110, the method may include transmitting a second signal indicating to the STA to switch, for a first TWT session of the set of TWT sessions, from a first frequency channel indicated by the first signal to a second frequency channel in accordance with a frequency hopping pattern associated with the first TWT session. The operations of 2110 may be performed in accordance with examples as disclosed herein. In some examples, aspects of the operations of 2110 may be performed by a switch indication component 1730 as described with reference to FIG. 17.

At 2115, the method may include communicating a third signal during a service period associated with the first TWT session over the second frequency channel based on the switching. The operations of 2115 may be performed in accordance with examples as disclosed herein. In some examples, aspects of the operations of 2115 may be performed by a frequency channel component 1735 as described with reference to FIG. 17.

Figure 22:
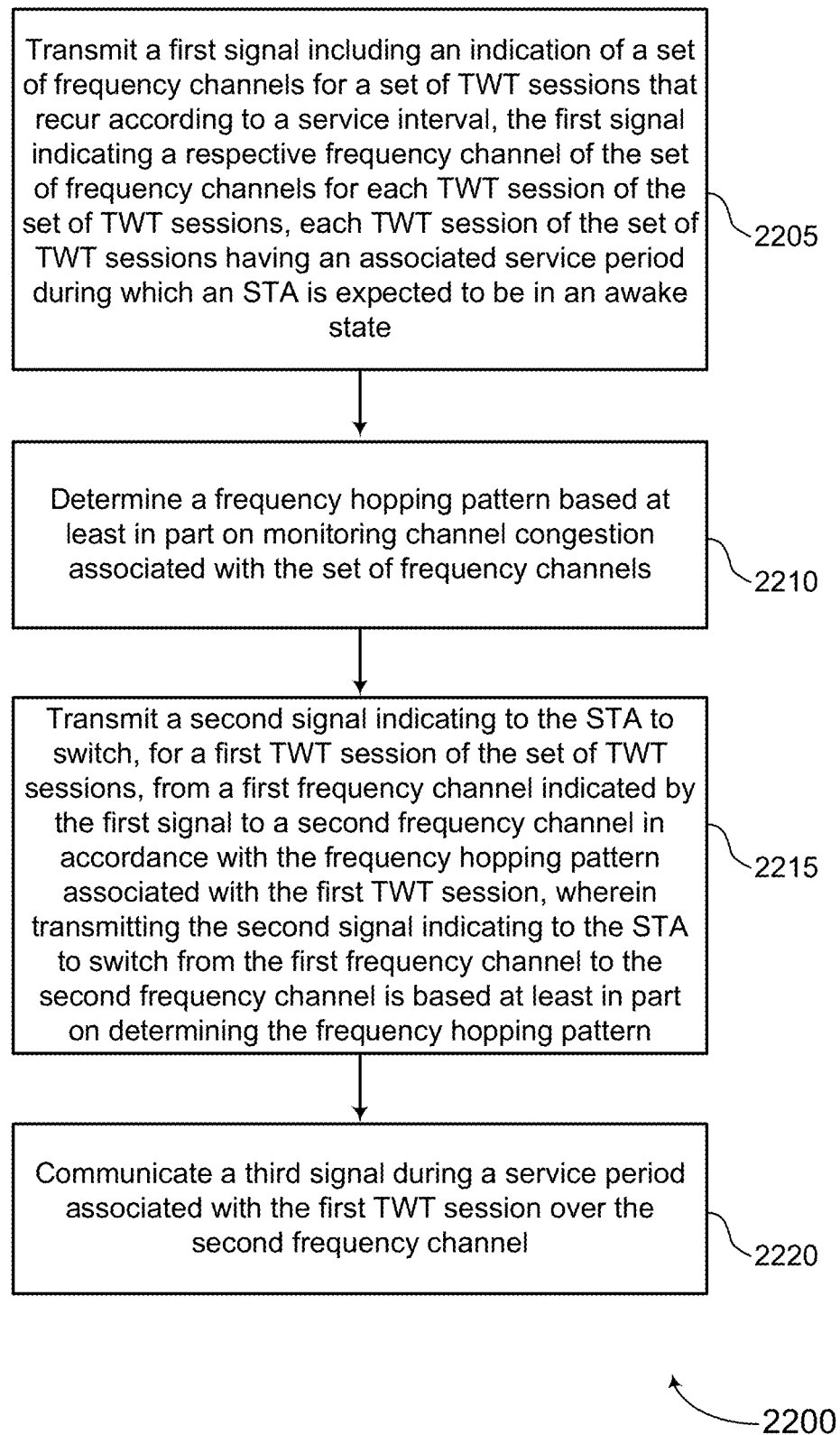

FIG. 22 shows a flowchart illustrating a method 2200 that supports managing hopping TWTs for wireless networks in accordance with one or more aspects of the present disclosure. The operations of the method 2200 may be implemented by an AP or its components. For example, the operations of the method 2200 may be performed by an AP as described with reference to FIGS. 1-10 and 15-18. In some examples, an AP may execute a set of instructions to control the functional elements of the AP to perform the described functions. Additionally, or alternatively, the AP may perform aspects of the described functions using special-purpose hardware.

At 2205, the method may include transmitting a first signal including an indication of a set of frequency channels for a set of TWT sessions that recur according to a service interval, the first signal indicating a respective frequency channel of the set of frequency channels for each TWT session of the set of TWT sessions, each TWT session of the set of TWT sessions having an associated service period during which a STA is expected to be in an awake state. The operations of 2205 may be performed in accordance with examples as disclosed herein. In some examples, aspects of the operations of 2205 may be performed by a frequency channel set indication component 1725 as described with reference to FIG. 17.

At 2210, the method may include determining the frequency hopping pattern based on monitoring channel congestion associated with the set of frequency channels. The operations of 2210 may be performed in accordance with examples as disclosed herein. In some examples, aspects of the operations of 2210 may be performed by a hopping pattern component 1740 as described with reference to FIG. 17.

At 2215, the method may include transmitting a second signal indicating to the STA to switch, for a first TWT session of the set of TWT sessions, from a first frequency channel indicated by the first signal to a second frequency channel in accordance with a frequency hopping pattern associated with the first TWT session, in which transmitting the second signal indicating to the STA to switch from the first frequency channel to the second frequency channel is based on determining the frequency hopping pattern. The operations of 2215 may be performed in accordance with examples as disclosed herein. In some examples, aspects of the operations of 2215 may be performed by a switch indication component 1730 as described with reference to FIG. 17.

At 2220, the method may include communicating a third signal during a service period associated with the first TWT session over the second frequency channel based on the switching. The operations of 2220 may be performed in accordance with examples as disclosed herein. In some examples, aspects of the operations of 2220 may be performed by a frequency channel component 1735 as described with reference to FIG. 17.

It is noted that the methods described herein describe possible implementations, and that the operations and the steps may be rearranged or otherwise modified and that other implementations are possible. Furthermore, aspects from two or more of the methods may be combined.

The following provides an overview of aspects of the present disclosure:

Aspect 1: A method for wireless communication at an STA, comprising: receiving a first signal including an indication of a set of frequency channels for a set of TWT sessions that recur according to a service interval, the first signal indicating a respective frequency channel of the set of frequency channels for each TWT session of the set of TWT sessions, each TWT session of the set of TWT sessions having an associated service period during which the STA is expected to be in an awake state; switching, for a first TWT session of the set of TWT sessions, from a first frequency channel indicated by the first signal to a second frequency channel in accordance with a frequency hopping pattern associated with the first TWT session; and communicating a second signal during a service period associated with the first TWT session over the second frequency channel based at least in part on the switching.

Aspect 2: The method of aspect 1, wherein communicating the second signal comprises: receiving, from an access point, the second signal during the service period associated with the first TWT session over the second frequency channel based at least in part on the switching.

Aspect 3: The method of aspect 1, wherein communicating the second signal comprises: transmitting, to another STA, the second signal during the service period associated with the first TWT session over the second frequency channel based at least in part on the switching.

Aspect 4: The method of any of aspects 1 through 3, wherein switching from the first frequency channel to the second frequency channel is based at least in part on a congestion condition associated with the first frequency channel.

Aspect 5: The method of aspect 4, wherein the congestion condition comprises a threshold latency metric or a threshold throughput metric, and switching from the first frequency channel to the second frequency channel is based at least in part on the threshold latency metric or the threshold throughput metric.

Aspect 6: The method of any of aspects 1 through 5, further comprising: receiving a third signal including an indication of the frequency hopping pattern, wherein switching from the first frequency channel to the second frequency channel is based at least in part on receiving the indication.

Aspect 7: The method of aspect 6, wherein the third signal comprises a beacon signal that includes the indication of the frequency hopping pattern, and the beacon signal is received by the STA prior to the service period associated with the first TWT session.

Aspect 8: The method of aspect 6, wherein the third signal comprises a data signal that includes the indication of the frequency hopping pattern, and the data signal is received by the STA during a previous service period associated with the first TWT session prior to the service period.

Aspect 9: The method of aspect 8, wherein the data signal comprises a quality of service data signal that includes one or more bits indicating to the STA to switch from the first frequency channel to the second frequency channel.

Aspect 10: The method of any of aspects 1 through 9, further comprising: receiving an indication of the second frequency channel, wherein switching from the first frequency channel to the second frequency channel is based at least in part on the received indication of the second frequency channel.

Aspect 11: The method of aspect 10, wherein the indication of the second frequency channel comprises a channel index corresponding to the second frequency channel, and switching from the first frequency channel to the second frequency channel is based at least in part on the channel index.

Aspect 12: The method of any of aspects 1 through 11, wherein the second frequency channel is based at least in part on data associated with the set of frequency channels and collected over a time duration prior to the first TWT session.

Aspect 13: The method of aspect 12, wherein the second frequency channel is based at least in part on a pseudo random seed.

Aspect 14: The method of any of aspects 1 through 13, further comprising: receiving a third signal during the service period associated with the first TWT session over the second frequency channel based at least in part on the switching, the third signal indicating to the STA to refrain from switching from the second frequency channel for a subsequent service period associated with the first TWT session after the service period.

Aspect 15: The method of any of aspects 1 through 14, wherein each TWT session of the set of TWT sessions is aligned with a respective TWT session of a second set of TWT sessions associated with another STA.

Aspect 16: The method of any of aspects 1 through 15, wherein at least one TWT session of the set of TWT sessions corresponds to a Wi-Fi connection between the STA and another STA.

Aspect 17: The method of any of aspects 1 through 16, wherein the STA is operating within an xPAN or an XR network.

Aspect 18: A method for wireless communication at an AP, comprising: transmitting a first signal including an indication of a set of frequency channels for a set of TWT sessions that recur according to a service interval, the first signal indicating a respective frequency channel of the set of frequency channels for each TWT session of the set of TWT sessions, each TWT session of the set of TWT sessions having an associated service period during which an STA is expected to be in an awake state; transmitting a second signal indicating to the STA to switch, for a first TWT session of the set of TWT sessions, from a first frequency channel indicated by the first signal to a second frequency channel in accordance with a frequency hopping pattern associated with the first TWT session; and communicating a third signal during a service period associated with the first TWT session over the second frequency channel.

Aspect 19: The method of aspect 18, further comprising: determining the frequency hopping pattern based at least in part on monitoring channel congestion associated with the set of frequency channels, wherein transmitting the second signal indicating to the STA to switch from the first frequency channel to the second frequency channel is based at least in part on determining the frequency hopping pattern.

Aspect 20: The method of any of aspects 18 through 19, wherein the second signal comprises a beacon signal that includes the indication of the frequency hopping pattern, and the beacon signal is transmitted prior to the service period associated with the first TWT session.

Aspect 21: The method of any of aspects 18 through 19, wherein the second signal comprises a data signal, and the data signal is transmitted during a previous service period associated with the first TWT session prior to the service period.

Aspect 22: The method of aspect 21, wherein the data signal comprises a quality of service data signal that includes one or more bits indicating to the STA to switch from the first frequency channel to the second frequency channel.

Aspect 23: The method of any of aspects 18 through 22, wherein transmitting the second signal indicating to the STA to switch from the first frequency channel to the second frequency channel comprises: transmitting an indication of the second frequency channel based at least in part on a congestion condition associated with the first frequency channel, wherein transmitting the second signal is based at least in part on transmitting the indication.

Aspect 24: The method of aspect 23, wherein the indication of the second frequency channel comprises a channel index corresponding to the second frequency channel.

Aspect 25: The method of any of aspects 18 through 24, wherein the second frequency channel is based at least in part on data associated with the set of frequency channels and collected over a time duration prior to the first TWT session.

Aspect 26: The method of aspect 25, wherein the second frequency channel is based at least in part on a pseudo random seed.

Aspect 27: The method of any of aspects 18 through 26, further comprising: transmitting a fourth signal during the service period associated with the first TWT session over the second frequency channel, the third signal indicating to the STA to refrain from switching from the second frequency channel for a subsequent service period associated with the first TWT session after the service period.

Aspect 28: The method of any of aspects 18 through 27, wherein transmitting the second signal indicating to the STA to switch from the first frequency channel to the second frequency channel is based at least in part on a congestion condition, and the congestion condition comprises a threshold latency metric or a threshold throughput metric.

Aspect 29: The method of any of aspects 18 through 28, wherein each TWT session of the set of TWT sessions is associated with the STA and aligned with a respective TWT session of a second set of TWT sessions associated with a second STA.

Aspect 30: The method of any of aspects 18 through 29, wherein at least one TWT session of the set of TWT sessions corresponds to a Wi-Fi connection between the STA and another STA.

Aspect 31: The method of any of aspects 18 through 30, wherein the AP is operating within an xPAN or an XR network.

Aspect 32: An apparatus for wireless communication at an STA, comprising a processor; memory coupled with the processor and storing instructions executable by the processor to cause the apparatus to perform a method of any of aspects 1 through 17.

Aspect 33: An apparatus for wireless communication at an STA, comprising at least one means for performing a method of any of aspects 1 through 17.

Aspect 34: A non-transitory computer-readable medium storing code for wireless communication at an STA, the code comprising instructions executable by a processor to perform a method of any of aspects 1 through 17.

Aspect 35: An apparatus for wireless communication at an AP, comprising a processor; memory coupled with the processor and storing instructions executable by the processor to cause the apparatus to perform a method of any of aspects 18 through 31.

Aspect 36: An apparatus for wireless communication at an AP, comprising at least one means for performing a method of any of aspects 18 through 31.

Aspect 37: A non-transitory computer-readable medium storing code for wireless communication at an AP, the code comprising instructions executable by a processor to perform a method of any of aspects 18 through 31.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, or Universal Terrestrial Radio Access (UTRA). CDMA2000 covers IS-2000, IS-95, and IS-856 standards. IS-2000 Releases may be commonly referred to as CDMA2000 1×, or IX. IS-856 (TIA-856) is commonly referred to as CDMA2000 1×EV-DO, or High Rate Packet Data (HRPD). UTRA includes Wideband CDMA (WCDMA) and other variants of CDMA. A time division multiple access (TDMA) system may implement a radio technology such as Global System for Mobile Communications (GSM). An orthogonal frequency division multiple access (OFDMA) system may implement a radio technology such as Ultra Mobile Broadband (UMB), Evolved UTRA (E-UTRA), IEEE 802.11 (Wi-Fi), IEEE 802.16 (WiMAX), IEEE 802.20, or Flash-OFDM.

The wireless communications system or systems described herein may support synchronous or asynchronous operation. For synchronous operation, the STAs may have similar frame timing, and transmissions from different STAs may be approximately aligned in time. For asynchronous operation, the STAs may have different frame timing, and transmissions from different STAs may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, WLAN 100 and 200 of FIGS. 1 and 2—may include one or more carriers, in which each carrier may be a signal made up of multiple sub-carriers (for example, waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (for example, a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (for example, A and B and C). Also, as used herein, the phrase "based on" shall not be construed as a reference to a closed set of conditions. For example, a step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc in which disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a station (STA), comprising:
    receiving a first signal including an indication of a set of frequency channels for a set of target wake time sessions that recur according to a service interval, the first signal indicating a respective frequency channel of the set of frequency channels for each target wake time session of the set of target wake time sessions, each target wake time session of the set of target wake time sessions having an associated service period during which the STA is expected to be in an awake state;
    switching, for a first target wake time session of the set of target wake time sessions, from a first frequency channel indicated by the first signal to a second frequency channel in accordance with a frequency hopping pattern associated with the first target wake time session; and
    communicating a second signal during a service period associated with the first target wake time session over the second frequency channel based at least in part on the switching.

2. The method of claim 1, wherein communicating the second signal comprises receiving, from an access point, the second signal during the service period associated with the first target wake time session over the second frequency channel based at least in part on the switching.

3. The method of claim 1, wherein communicating the second signal comprises transmitting, to another STA, the second signal during the service period associated with the first target wake time session over the second frequency channel based at least in part on the switching.

4. The method of claim 1, wherein switching from the first frequency channel to the second frequency channel is based at least in part on a congestion condition associated with the first frequency channel.

5. The method of claim 4, wherein:
    the congestion condition comprises a threshold latency metric or a threshold throughput metric, and
    switching from the first frequency channel to the second frequency channel is based at least in part on the threshold latency metric or the threshold throughput metric.

6. The method of claim 1, further comprising receiving a third signal including an indication of the frequency hopping pattern, wherein switching from the first frequency channel to the second frequency channel is based at least in part on receiving the indication.

7. The method of claim 6, wherein:
    the third signal comprises a beacon signal that includes the indication of the frequency hopping pattern, and
    the beacon signal is received by the STA prior to the service period associated with the first target wake time session.

8. The method of claim 6, wherein:
    the third signal comprises a data signal that includes the indication of the frequency hopping pattern, and
    the data signal is received by the STA during a previous service period associated with the first target wake time session prior to the service period.

9. The method of claim 8, wherein the data signal comprises a quality of service data signal that includes one or more bits indicating to the STA to switch from the first frequency channel to the second frequency channel.

10. The method of claim 1, further comprising receiving an indication of the second frequency channel, wherein switching from the first frequency channel to the second frequency channel is based at least in part on the received indication of the second frequency channel.

11. The method of claim 10, wherein:
the indication of the second frequency channel comprises a channel index corresponding to the second frequency channel, and
switching from the first frequency channel to the second frequency channel is based at least in part on the channel index.

12. The method of claim 1, wherein the second frequency channel is based at least in part on data associated with the set of frequency channels and collected over a time duration prior to the first target wake time session.

13. The method of claim 12, wherein the second frequency channel is based at least in part on a pseudo random seed.

14. The method of claim 1, further comprising receiving a third signal during the service period associated with the first target wake time session over the second frequency channel based at least in part on the switching, the third signal indicating to the STA to refrain from switching from the second frequency channel for a subsequent service period associated with the first target wake time session after the service period.

15. The method of claim 1, wherein each target wake time session of the set of target wake time sessions is aligned with a respective target wake time session of a second set of target wake time sessions associated with another STA.

16. The method of claim 1, wherein at least one target wake time session of the set of target wake time sessions corresponds to a Wi-Fi connection between the STA and another STA.

17. The method of claim 1, wherein the STA is operating within an extended personal area network or an extended reality network.

18. A method for wireless communication at an access point (AP), comprising:
transmitting a first signal including an indication of a set of frequency channels for a set of target wake time sessions that recur according to a service interval, the first signal indicating a respective frequency channel of the set of frequency channels for each target wake time session of the set of target wake time sessions, each target wake time session of the set of target wake time sessions having an associated service period during which a station (STA) is expected to be in an awake state;
transmitting a second signal indicating to the STA to switch, for a first target wake time session of the set of target wake time sessions, from a first frequency channel indicated by the first signal to a second frequency channel in accordance with a frequency hopping pattern associated with the first target wake time session; and
communicating a third signal during a service period associated with the first target wake time session over the second frequency channel.

19. The method of claim 18, further comprising determining the frequency hopping pattern based at least in part on monitoring channel congestion associated with the set of frequency channels, wherein transmitting the second signal indicating to the STA to switch from the first frequency channel to the second frequency channel is based at least in part on determining the frequency hopping pattern.

20. The method of claim 18, wherein:
the second signal comprises a beacon signal that includes the indication of the frequency hopping pattern, and
the beacon signal is transmitted prior to the service period associated with the first target wake time session.

21. The method of claim 18, wherein:
the second signal comprises a data signal that includes the indication of the frequency hopping pattern, and
the data signal is transmitted during a previous service period associated with the first target wake time session prior to the service period.

22. The method of claim 21, wherein the data signal comprises a quality of service data signal that includes one or more bits indicating to the STA to switch from the first frequency channel to the second frequency channel.

23. The method of claim 18, wherein transmitting the second signal indicating to the STA to switch from the first frequency channel to the second frequency channel comprises transmitting an indication of the second frequency channel based at least in part on a congestion condition associated with the first frequency channel, wherein transmitting the second signal is based at least in part on transmitting the indication.

24. The method of claim 23, wherein the indication of the second frequency channel comprises a channel index corresponding to the second frequency channel.

25. The method of claim 18, wherein the second frequency channel is based at least in part on data associated with the set of frequency channels and collected over a time duration prior to the first target wake time session.

26. The method of claim 25, wherein the second frequency channel is based at least in part on a pseudo random seed.

27. The method of claim 18, further comprising transmitting a fourth signal during the service period associated with the first target wake time session over the second frequency channel, the third signal indicating to the STA to refrain from switching from the second frequency channel for a subsequent service period associated with the first target wake time session after the service period.

28. The method of claim 18, wherein:
transmitting the second signal indicating to the STA to switch from the first frequency channel to the second frequency channel is based at least in part on a congestion condition, and
the congestion condition comprises a threshold latency metric or a threshold throughput metric.

29. The method of claim 18, wherein each target wake time session of the set of target wake time sessions is associated with the STA and aligned with a respective target wake time session of a second set of target wake time sessions associated with a second STA.

30. The method of claim 18, wherein at least one target wake time session of the set of target wake time sessions corresponds to a Wi-Fi connection between the STA and another STA.

31. The method of claim 18, wherein the AP is operating within an extended personal area network or an extended reality network.

32. An apparatus for wireless communication at a station (STA), comprising:
a processor; and
memory coupled with the processor and storing instructions executable by the processor to cause the apparatus to:
receive a first signal including an indication of a set of frequency channels for a set of target wake time sessions that recur according to a service interval, the first signal indicating a respective frequency channel of the set of frequency channels for each target wake time session of the set of target wake time sessions, each target wake time session of the set of target wake time sessions having an associated service period during which the STA is expected to be in an awake state;

switching, for a first target wake time session of the set of target wake time sessions, from a first frequency channel indicated by the first signal to a second frequency channel in accordance with a frequency hopping pattern associated with the first target wake time session; and communicate a second signal during a service period associated with the first target wake time session over the second frequency channel based at least in part on the switching.

33. The apparatus of claim 32, wherein the instructions to communicate the second signal are executable by the processor to cause the apparatus to receive, from an access point, the second signal during the service period associated with the first target wake time session over the second frequency channel based at least in part on the switching.

34. The apparatus of claim 32, wherein the instructions to communicate the second signal are executable by the processor to cause the apparatus to transmit, to another STA, the second signal during the service period associated with the first target wake time session over the second frequency channel based at least in part on the switching.

35. The apparatus of claim 32, wherein switching from the first frequency channel to the second frequency channel is based at least in part on a congestion condition associated with the first frequency channel.

36. The apparatus of claim 35, wherein:
the congestion condition comprises a threshold latency metric or a threshold throughput metric, and
switching from the first frequency channel to the second frequency channel is based at least in part on the threshold latency metric or the threshold throughput metric.

37. The apparatus of claim 32, wherein the instructions are further executable by the processor to cause the apparatus to receive a third signal including an indication of the frequency hopping pattern, wherein switching from the first frequency channel to the second frequency channel is based at least in part on receiving the indication.

38. The apparatus of claim 37, wherein:
the third signal comprises a beacon signal that includes the indication of the frequency hopping pattern, and
the beacon signal is received by the STA prior to the service period associated with the first target wake time session.

39. The apparatus of claim 37, wherein:
the third signal comprises a data signal that includes the indication of the frequency hopping pattern, and
the data signal is received by the STA during a previous service period associated with the first target wake time session prior to the service period.

40. The apparatus of claim 39, wherein the data signal comprises a quality of service data signal that includes one or more bits indicating to the STA to switch from the first frequency channel to the second frequency channel.

41. The apparatus of claim 32, wherein the instructions are further executable by the processor to cause the apparatus to receive an indication of the second frequency channel, wherein switching from the first frequency channel to the second frequency channel is based at least in part on the received indication of the second frequency channel.

42. The apparatus of claim 41, wherein:
the indication of the second frequency channel comprises a channel index corresponding to the second frequency channel, and
switching from the first frequency channel to the second frequency channel is based at least in part on the channel index.

43. The apparatus of claim 32, wherein the second frequency channel is based at least in part on data associated with the set of frequency channels and collected over a time duration prior to the first target wake time session.

44. The apparatus of claim 43, wherein the second frequency channel is based at least in part on a pseudo random seed.

45. The apparatus of claim 32, wherein the instructions are further executable by the processor to cause the apparatus to receive a third signal during the service period associated with the first target wake time session over the second frequency channel based at least in part on the switching, the third signal indicating to the STA to refrain from switching from the second frequency channel for a subsequent service period associated with the first target wake time session after the service period.

46. The apparatus of claim 32, wherein each target wake time session of the set of target wake time sessions is aligned with a respective target wake time session of a second set of target wake time sessions associated with another STA.

47. The apparatus of claim 32, wherein at least one target wake time session of the set of target wake time sessions corresponds to a Wi-Fi connection between the STA and another STA.

48. The apparatus of claim 32, wherein the STA is operating within an extended personal area network or an extended reality network.

49. An apparatus for wireless communication at an access point (AP), comprising:
a processor; and
memory coupled with the processor and storing instructions executable by the processor to cause the apparatus to:
transmit a first signal including an indication of a set of frequency channels for a set of target wake time sessions that recur according to a service interval, the first signal indicating a respective frequency channel of the set of frequency channels for each target wake time session of the set of target wake time sessions, each target wake time session of the set of target wake time sessions having an associated service period during which a station (STA) is expected to be in an awake state;
transmit a second signal indicating to the STA to switch, for a first target wake time session of the set of target wake time sessions, from a first frequency channel indicated by the first signal to a second frequency channel in accordance with a frequency hopping pattern associated with the first target wake time session; and
communicate a third signal during a service period associated with the first target wake time session over the second frequency channel.

50. The apparatus of claim 49, wherein the instructions are further executable by the processor to cause the apparatus to determine the frequency hopping pattern based at least in part on monitoring channel congestion associated with the set of frequency channels, wherein transmitting the second signal indicating to the STA to switch from the first frequency channel to the second frequency channel is based at least in part on determining the frequency hopping pattern.

51. The apparatus of claim 49, wherein:
the second signal comprises a beacon signal that includes the indication of the frequency hopping pattern, and
the beacon signal is transmitted prior to the service period associated with the first target wake time session.

52. The apparatus of claim 49, wherein:
the second signal comprises a data signal that includes the indication of the frequency hopping pattern, and
the data signal is transmitted during a previous service period associated with the first target wake time session prior to the service period.

53. The apparatus of claim 52, wherein the data signal comprises a quality of service data signal that includes one or more bits indicating to the STA to switch from the first frequency channel to the second frequency channel.

54. The apparatus of claim 49, wherein the instructions to transmit the second signal indicating to the STA to switch from the first frequency channel to the second frequency channel are executable by the processor to cause the apparatus to transmit an indication of the second frequency channel based at least in part on a congestion condition associated with the first frequency channel, wherein transmitting the second signal is based at least in part on transmitting the indication.

55. The apparatus of claim 54, wherein the indication of the second frequency channel comprises a channel index corresponding to the second frequency channel.

56. The apparatus of claim 49, wherein the second frequency channel is based at least in part on data associated with the set of frequency channels and collected over a time duration prior to the first target wake time session.

57. The apparatus of claim 56, wherein the second frequency channel is based at least in part on a pseudo random seed.

58. The apparatus of claim 49, wherein the instructions are further executable by the processor to cause the apparatus to transmit a fourth signal during the service period associated with the first target wake time session over the second frequency channel, the third signal indicating to the STA to refrain from switching from the second frequency channel for a subsequent service period associated with the first target wake time session after the service period.

59. The apparatus of claim 49, wherein:
transmitting the second signal indicating to the STA to switch from the first frequency channel to the second frequency channel is based at least in part on a congestion condition, and
the congestion condition comprises a threshold latency metric or a threshold throughput metric.

60. The apparatus of claim 49, wherein each target wake time session of the set of target wake time sessions is associated with the STA and aligned with a respective target wake time session of a second set of target wake time sessions associated with a second STA.

61. The apparatus of claim 49, wherein at least one target wake time session of the set of target wake time sessions corresponds to a Wi-Fi connection between the STA and another STA.

62. The apparatus of claim 49, wherein the AP is operating within an extended personal area network or an extended reality network.

* * * * *